United States Patent
Oishi

(10) Patent No.: US 9,412,129 B2
(45) Date of Patent: Aug. 9, 2016

(54) EQUALIZATION USING USER INPUT

(71) Applicant: Skullcandy, Inc., Park City, UT (US)

(72) Inventor: Tetsuro Oishi, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 109 days.

(21) Appl. No.: 14/136,632

(22) Filed: Dec. 20, 2013

(65) Prior Publication Data

US 2014/0193001 A1 Jul. 10, 2014

Related U.S. Application Data

(60) Provisional application No. 61/749,180, filed on Jan. 4, 2013.

(51) Int. Cl.
| | |
|---|---|
| *H03G 5/00* | (2006.01) |
| *H04R 3/04* | (2006.01) |
| *G06Q 30/06* | (2012.01) |
| *G06Q 50/00* | (2012.01) |

(52) U.S. Cl.
CPC .............. *G06Q 30/0631* (2013.01); *H04R 3/04* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,275,843 | B2 * | 9/2012 | Anantharaman ..... | H04M 3/568 709/206 |
| 2008/0181424 | A1 | 7/2008 | Schulein et al. | |
| 2009/0030693 | A1 * | 1/2009 | Shaffer .................... | G10L 25/69 704/270 |
| 2009/0122999 | A1 | 5/2009 | Oh et al. | |
| 2011/0002471 | A1 | 1/2011 | Wihardja et al. | |
| 2011/0131224 | A1 * | 6/2011 | Bodin ..................... | G06Q 30/02 707/758 |
| 2011/0138064 | A1 * | 6/2011 | Rieger .............. | G06F 17/30905 709/228 |
| 2011/0144779 | A1 | 6/2011 | Janse et al. | |
| 2011/0161377 | A1 * | 6/2011 | Reed, Jr. ............ | G06F 17/30017 707/803 |
| 2011/0295394 | A1 * | 12/2011 | Zhao ..................... | G11B 27/105 700/94 |
| 2013/0022189 | A1 * | 1/2013 | Ganong, III .......... | H04M 3/568 379/202.01 |
| 2013/0121494 | A1 * | 5/2013 | Johnston .............. | H04R 1/1041 381/56 |
| 2013/0339859 | A1 | 12/2013 | Hardi | |

FOREIGN PATENT DOCUMENTS

KR 1020090011868 A 2/2009

OTHER PUBLICATIONS

International Search Report and Written Opinion, as issued in connection with International Patent Application No. PCT/US2014/071895, mailed Apr. 21, 2015, 11 pgs.

* cited by examiner

*Primary Examiner* — Thang Tran
(74) *Attorney, Agent, or Firm* — Maschoff Brennan

(57) ABSTRACT

A system for interacting with an audio reproduction device and a user using the audio reproduction device is disclosed. The system includes: an image capture module capturing an image depicting an audio reproduction device used by a user; an image recognition module performing image recognition to extract recognition data from the image, the recognition data including data describing the audio reproduction device and one or more deteriorating factors that deteriorate a sound quality in the audio reproduction device; a filter module estimating a sound degradation in the audio reproduction device that is caused by the one or more deteriorating factors, the filter module applying a digital filter to compensate the sound degradation in the audio reproduction device; an aggregation module aggregating data associated with the user, the aggregated data including the recognition data; and a recommendation module providing one or more recommended items to the user.

20 Claims, 35 Drawing Sheets

400

Instructions:

Please fill in the questionnaire below and we will provide you awesome products matching to your answers.

- What genre of music do you like?

○ Pop    ○ Rock    ○ Classic    ○ Other (Please specify:____)

- Which artist do you like?

(Please fill in your favorite artists)

- What price?

○ Below $15    ○ Between $15 and $30    ○ Above $30

- What color do you like?

○ White    ○ Black    ○ Silver    ○ Other (Please specify:____)

- Pick a category

○ Wireless headset    ○ Cellular headset    ○ Corded headset
  ○ Computer headset

402

Other specifications?

404

Submit     Cancel

| One-Third Octave bands | | |
|---|---|---|
| Lower Band Limit (Hz) | Center Frequency (Hz) | Upper Band Limit (Hz) |
| 14.1 | 16 | 17.8 |
| 17.8 | 20 | 22.4 |
| 22.4 | 25 | 28.2 |
| 28.2 | 31.5 | 35.5 |
| 35.5 | 40 | 44.7 |
| 44.7 | 50 | 56.2 |
| 56.2 | 63 | 70.8 |
| 70.8 | 80 | 89.1 |
| 89.1 | 100 | 112 |
| 112 | 125 | 141 |
| 141 | 160 | 178 |
| 178 | 200 | 224 |
| 224 | 250 | 282 |
| 282 | 315 | 355 |
| 355 | 400 | 447 |
| 447 | 500 | 562 |
| 562 | 630 | 708 |
| 708 | 800 | 891 |
| 891 | 1000 | 1122 |
| 1122 | 1250 | 1413 |
| 1413 | 1600 | 1778 |
| 1778 | 2000 | 2239 |
| 2239 | 2500 | 2818 |
| 2818 | 3150 | 3548 |
| 3548 | 4000 | 4467 |
| 4467 | 5000 | 5623 |
| 5623 | 6300 | 7079 |
| 7079 | 8000 | 8913 |
| 8913 | 10000 | 11220 |
| 11220 | 12500 | 14130 |
| 14130 | 16000 | 17780 |
| 17780 | 20000 | 22390 |

_US 9,412,129 B2_

EQUALIZATION USING USER INPUT

CROSS-REFERENCE TO RELATED APPLICATIONS

This application is based upon and claims the benefit of priority of U.S. Provisional Application No. 61/749,180, filed on Jan. 4, 2013. The entirety of the forgoing application is incorporated herein by reference.

BACKGROUND

The specification relates to audio reproduction devices. In particular, the specification relates to interacting with audio reproduction devices and users that use audio reproduction devices.

Users can listen to music using a music player and a headset. When using an audio reproduction device such as a headset to listen to music, a user may want to improve sound quality in the audio reproduction device. A user may also want to look for new audio reproduction devices and new music that match the user's interest. It is desirable to improve sound quality in an audio reproduction device when a user uses the audio reproduction device to listen to music. It is also desirable to provide device recommendation and/or music recommendation to a user.

SUMMARY

A system for interacting with audio reproduction devices and users that use audio reproduction devices is disclosed. The system includes: an image capture module capturing an image depicting a first audio reproduction device used by a first user; an image recognition module performing image recognition on the captured image to extract recognition data from the image, the recognition data including data describing the first audio reproduction device and one or more deteriorating factors that deteriorate a sound quality in the first audio reproduction device; a filter module estimating a sound degradation in the first audio reproduction device that is caused by the one or more deteriorating factors, the filter module applying a first digital filter to compensate the sound degradation in the first audio reproduction device; an aggregation module aggregating data associated with the first user, the aggregated data including the recognition data; and a recommendation module providing one or more recommended items to the first user based on the aggregated data.

The system is particularly advantageous in numerous respects. First, the system applies image recognition techniques to extract recognition data and improves sound quality in audio reproduction devices using the extracted recognition data. The system applies various equalization processes to filter audio signals and therefore improves sound quality of the sound reproduced by audio reproduction devices. Second, the system aggregates data associated with a user and provides various recommended items (e.g., recommended headphones, music, etc.) to the user based on the aggregated data. Third, the system provides target sound signature data describing a target sound signature and/or a sound signature within a target sound range. The system tunes audio reproduction devices to reproduce a sound wave matching either the target sound signature or a sound signature within the target sound range. The system also has numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIG. 4 is a graphic representation illustrating an example user interface depicting one or more queries according to one embodiment.

DETAILED DESCRIPTION

Figure 1:
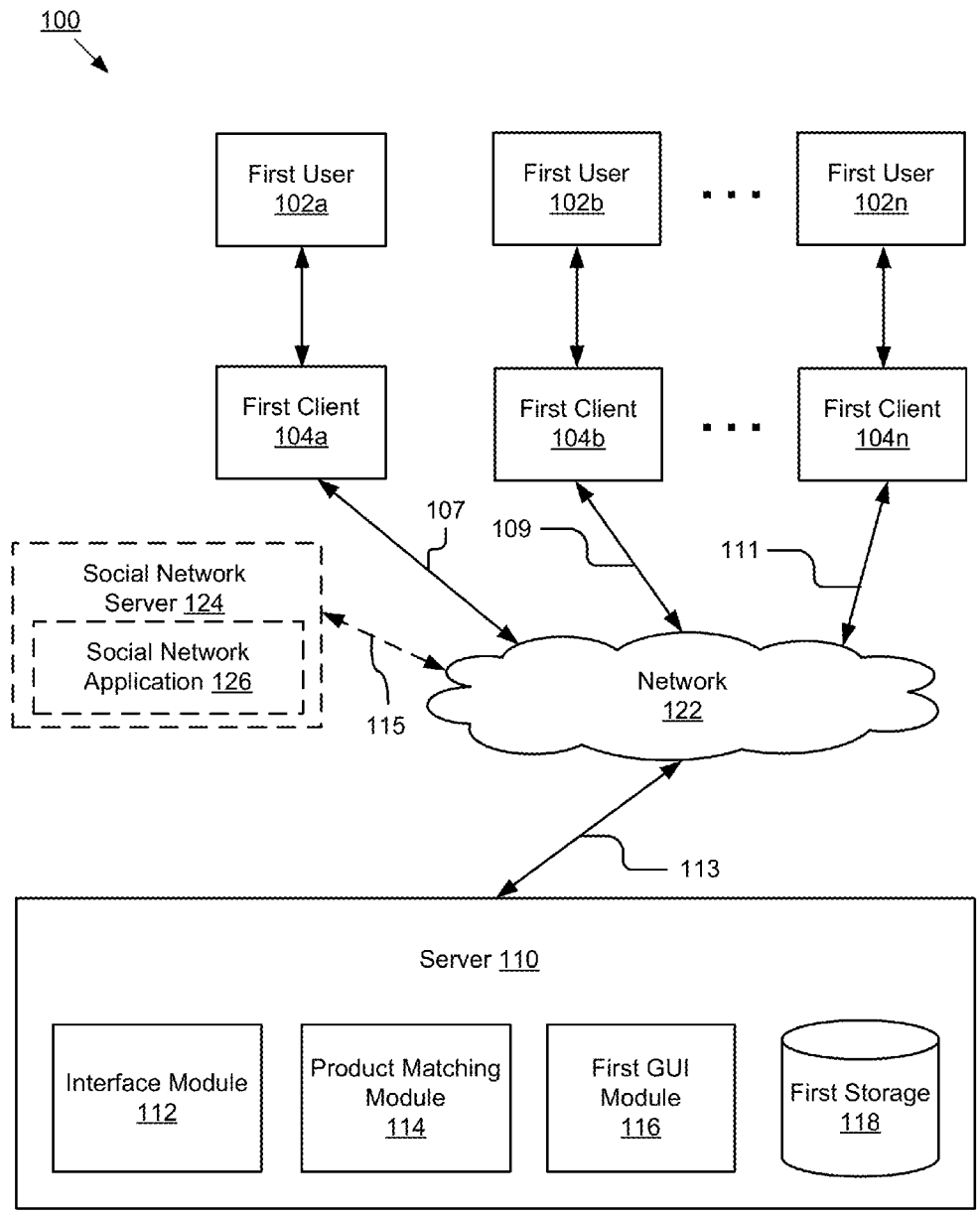
FIG. 1 illustrates a high-level block diagram of a product matching system for determining one or more matching products for a user according to one embodiment.

FIG. 1 is a high-level block diagram illustrating a product matching system 100 for determining one or more matching products for a user according to one embodiment. The product matching system 100 includes a server 110 and one or more first clients 104a, 104b ... 104n (referred to individually or collectively as first client 104) that interact with one or more first users 102a, 102b ... 102n (referred to individually or collectively as first user 102). The product matching system 100 optionally includes a social network server 124. In the illustrated embodiment, the entities of the product matching system 100 are communicatively coupled to each other via a network 122. Although only three first clients 104a, 104b ... 104n and one server 110 are illustrated, the system 100 can include any number of first clients 104 and any number of servers 110. While a single network 122 is shown in FIG. 1, the product matching system 100 may include any number of networks 122.

The first client 104a is communicatively coupled to the network 122 via signal line 107. The first client 104b is communicatively coupled to the network 122 via signal line 109. The first client 104n is communicatively coupled to the network 122 via signal line 111. The server 110 is communicatively coupled to the network 122 via signal line 113. The social network server 124 is communicatively coupled to the network 122 via signal line 115. In one embodiment, signal lines 107, 109, 111, 113 and 115 are wireless connections such as wireless Local Area Network (LAN) connections, Bluetooth connections, etc. In another embodiment, signal lines 107, 109, 111, 113 and 115 are wired connections such as connections via a cable, a landline, etc. In yet another embodiment, signal lines 107, 109, 111, 113 and 115 are any combination of wireless connections and wired connections.

The first client 104 is any processor-based computing device. The first client 104 executes client software such as a web browser or built-in client application and connects to the server 110 via the network 122. In one embodiment, the first client 104 includes a variety of different computing devices. Examples of a first client device 104 include, but are not limited to: a personal computer; a personal digital assistant; a television set-top box; a tablet computer; a cell phone (e.g., a smart phone); a laptop computer; a portable music player; a video game player; and any other electronic device including a processor and a memory. The first client 104 includes a processor (not pictured), a memory (not pictured) and other components conventional to a computing device. A first user 102 interacts with a first client 104. A first user 102 is, for example, a human user.

The server 110 is any computing device having a processor (not pictured) and a computer-readable storage medium (not pictured) storing data for providing matching products to users. In the depicted embodiment, the server 110 includes an interface module 112, a product matching module 114, a first Graphical User Interface (GUI) module 116 and a first storage device 118. In one embodiment, the components of the server 110 are communicatively coupled to each other.

The interface module 112 is an interface for connecting the server 110 to a network 122. For example, the interface module 112 is a network adapter that connects the server 110 to the network 122. In one embodiment, the interface module 112 includes code and routines for handling communication between components of the server 110 and other entities of the product matching system 100. For example, the interface module 112 receives data from a first client 104 via the network 122 and sends the data to the product matching module 114. In another example, the interface module 112 receives graphical data for depicting a user interface from the first GUI module 116 and sends the graphical data to a first client 104 via the network 122, causing the first client 104 to present the user interface to a first user 102.

In one embodiment, the interface module 112 includes a port for direct physical connection to the network 122 or to another communication channel. For example, the interface module 112 includes a universal serial bus (USB), category 5 cable (CAT-5) or similar port for wired communication with the network 122. In another embodiment, the interface module 112 includes a wireless transceiver for exchanging data with the network 122, or with another communication channel, using one or more wireless communication methods, such as IEEE 802.11, IEEE 802.16, BLUETOOTH®, near field communication (NFC) or another suitable wireless communication method. In one embodiment, the interface module 112 includes a NFC chip that generates a radio frequency (RF) for short-range communication.

In some embodiments, the interface module 112 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the interface module 112 also provides other conventional connections to the network 122 for distribution of files and/or media objects using standard network protocols including TCP/IP, HTTP, HTTPS and SMTP, etc.

The product matching module 114 is code and routines for determining one or more matching products for a first user 102. In one embodiment, the product matching module 114 includes code and routines stored in an on-chip storage (not pictured) of a processor (not pictured) included in the server 110. In another embodiment, the product matching module 114 is implemented using hardware such as a field-programmable gate array (FPGA) or an application-specific integrated circuit (ASIC). In yet another embodiment, the product matching module 114 is implemented using a combination of hardware and software. The product matching module 114 is described below in more detail with reference to FIGS. 2-3.

A matching product can be an audio reproduction device that matches answers provided by the first user 102 for one or more queries. Examples of the queries are shown below in FIG. 4. In one embodiment, a matching product is a product that matches a first user's 102 interest. For example, a matching product is a headset that a first user 102 has added to a wish list. In another example, a matching product is an album issued by the first user's 102 favorite band.

An audio reproduction device can be any type of audio reproduction device such as a headphone device, an ear bud device, a speaker dock, a speaker system, a super-aural and a supra-aural headphone device, an in-ear headphone device, a headset or any other audio reproduction device, etc. In one embodiment, the audio reproduction device is a product that is sold by an entity associated with the product matching system.

The first GUI module 116 is code and routines for generating graphical data for providing a GUI to a first user 102. In one embodiment, the first GUI module 116 retrieves data (e.g., query data, suggestion data) from the first storage 118 and generates graphical data for providing a GUI to a first user 102 based on the retrieved data. The query data and the suggestion data are described below with reference to FIG. 2. In another embodiment, the first GUI module 116 receives data describing one or more matching products and generates graphical data for providing a GUI depicting the one or more matching products. The first GUI module 116 sends the graphical data to the interface module 112. The interface module 112 sends the graphical data to a first client 104, causing the first client 104 to present the GUI to a first user 102.

The first storage device 118 is a non-transitory memory that stores data. For example, the first storage device 118 is a dynamic random access memory (DRAM) device, a static random access memory (SRAM) device, flash memory or some other memory device. In one embodiment, the first storage device 118 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. The first storage device 118 is described below in more detail with reference to FIG. 2.

The network 122 is a conventional type of network, wired or wireless, and may have any number of configurations such as a star configuration, token ring configuration or other configurations. In one embodiment, the network 122 includes one or more of a local area network (LAN), a wide area network (WAN) (e.g., the Internet) and/or any other interconnected data path across which multiple devices communicate. In another embodiment, the network 122 is a peer-to-peer network. The network 122 is coupled to or includes portions of a telecommunications network for sending data in a variety of different communication protocols. For example, the network 122 is a 3G network or a 4G network. In yet another embodiment, the network 122 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. In yet another embodiment, all or some of the links in the network 122 are encrypted using conventional encryption technologies such as secure sockets layer (SSL), secure HTTP and/or virtual private networks (VPNs).

The social network server 124 is any computing device having a processor (not pictured) and a computer-readable storage medium (not pictured) storing data for providing a social network to users. Although only one social network server 124 is shown in FIG. 1, multiple social network servers 124 may be present. A social network is any type of social structure where the users are connected by a common feature including friendship, family, work, an interest, etc. The common features are provided by one or more social networking systems, such as those included in the product matching system 100, including explicitly-defined relationships and relationships implied by social connections with other users, where the relationships are defined in a social graph. The social graph is a mapping of all users in a social network and how they are related to each other.

In the depicted embodiment, the social network server 124 includes a social network application 126. The social network application 126 includes code and routines stored on a memory (not pictured) of the social network server 124 that, when executed by a processor (not pictured) of the social network server 124, causes the social network server 124 to provide a social network accessible by a first client 104 via the network 122. In one embodiment, a first user 102 publishes comments on the social network. For example, a first user 102 provides a brief review of a headset product on the social network and other first users 102 post comments on the brief review. In another embodiment, a first user 102 marks a product as a "liked" product on a social network. Social activities that a first user 102 performs on a social network include, but are not limited to, posting a comment on a product review, endorsing a product, publishing a post related to a product, conducting a review for a product and adding a playlist including one or more favorite pieces of music, etc. In one embodiment, the product matching module 114 determines a product that matches a first user's 102 interest and the matching product is posted in the social network in association with the first user's 102 social network account.

Figure 2:
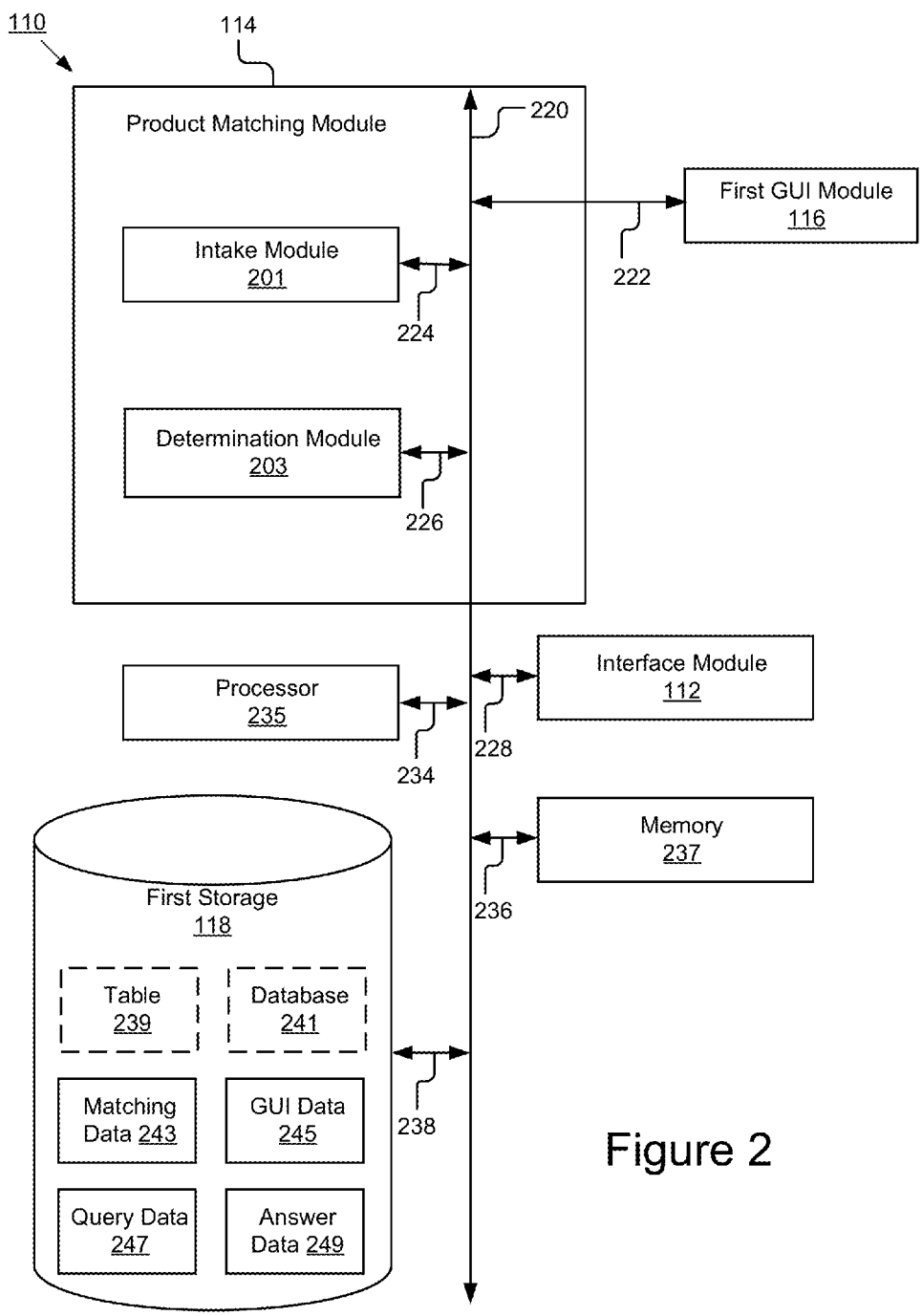
FIG. 2 is a block diagram illustrating a product matching module according to one embodiment.

Referring now to FIG. 2, an example of the product matching module 114 is shown in more detail. FIG. 2 is a block diagram illustrating a server 110 that includes a product matching module 114, a processor 235, a memory 237, an interface module 112, a first storage 118 and a first GUI module 116 according to some embodiments. The components of the server 110 are communicatively coupled to each other via a bus 220. For example, the processor 235 is communicatively coupled to the bus 220 via signal line 234. The memory 237 is communicatively coupled to the bus 220 via signal line 236. The interface module 112 is communicatively coupled to the bus 220 via signal line 228. The first storage 118 is communicatively coupled to the bus 220 via signal line 238. The first GUI module 116 is communicatively coupled to the bus 220 via signal line 222.

The processor 235 includes an arithmetic logic unit, a microprocessor, a general purpose controller or some other processor array to perform computations and retrieve data stored on the first storage 118, etc. The processor 235 processes data signals and may include various computing architectures including a complex instruction set computer (CISC) architecture, a reduced instruction set computer (RISC) architecture, or an architecture implementing a combination of instruction sets. Although only a single processor 235 is shown in FIG. 2, multiple processors 235 may be included. The processing capability may be limited to supporting the display of images and the capture and transmission of images. The processing capability might be enough to perform more complex tasks, including various types of feature extraction and sampling. In other embodiments, other processors, operating systems, sensors, displays and physical configurations are possible.

The memory 237 stores instructions and/or data that may be executed by the processor 235. The instructions and/or data may include code for performing any and/or all of the techniques described herein. The memory 237 may be a dynamic random access memory (DRAM) device, a static random access memory (SRAM) device, flash memory or some other memory device. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the first storage 118 stores data that includes matching data 243, GUI data 245, query data 247 and answer data 249. In one embodiment, the matching data 243 is stored in a table 239. In another embodiment, the matching data 243 is stored in a database 241. The table 239 and the database 241 are depicted using dashed lines to indicate that they are optional features.

The table 239 is a table for storing the matching data 243. In one embodiment, the table 239 includes one or more rows and/or one or more columns for storing data describing one or more products. For example, the table 239 stores data describing the color, price, features and technical specifications for a product. In one embodiment, a product is an audio reproduction device such as headphones, a headset, a speaker, a super-aural and a supra-aural headphone device, an in-ear headphone device, an ear bud headphone device, a speaker dock or any other audio reproduction device.

The database 241 stores the matching data 243. In one embodiment, the database 241 stores data describing one or more products. For example, the database 241 stores data describing the color, price, features and technical specifications for a product. The database 241 may store any other data for providing the functionality described herein.

The matching data 243 is data describing one or more products. For example, the matching data 243 includes data describing the color, price, features and technical specifications for one or more products. In one embodiment, the features for a product include one or more of a connection type (e.g., corded, wireless, etc.), a wearing style (e.g., over-the-head, over-the-ear or convertible between over-the-head and over-the-ear, etc.) and an ear style (e.g., single ear version, dual ear version, etc.). In some embodiments, other features such as including a built-in microphone (e.g., noise-cancelling microphone) are possible. In one embodiment, the matching data 243 is utilized by the product matching module 114 to determine a product that best matches the answers provided by a first user 102.

The GUI data 245 is graphical data for providing one or more GUIs to a first user 102. For example, the GUI data 245 includes graphical data for providing a GUI that depicts a questionnaire including one or more queries for the first user 102. In some embodiments, the GUI data 245 may include any other graphical data for depicting the GUIs described herein (e.g., the GUI depicted below in FIG. 4).

The query data 247 is data describing one or more queries. For example, the query data 247 includes data describing one or more queries that are provided to the first user 102. Examples of the queries include, but are not limited to: who is the first user's 102 favorite music artist; what genre of music the first user 102 likes; what price range the first user 102 prefers; and what features the first user 102 prefers in a product (e.g., over-ear or in-ear style, noise-canceling features, etc.). Examples of the queries are illustrated below in FIG. 4.

The answer data 249 is data describing one or more answers provided by the first user 102 to the one or more queries. For example, the answer data 249 includes data describing one or more answers to the queries presented in a user interface. In one embodiment, the answer data 249 includes data describing one or more comments provided by the first user 102.

In the depicted embodiment shown in FIG. 2, the product matching module 114 includes an intake module 201 and a determination module 203. The intake module 201 is communicatively coupled to the bus 220 via signal line 224. The determination module 203 is communicatively coupled to the bus 220 via signal line 226.

The intake module 201 is code and routines that, when executed by the processor 235, receives answer data from a first user 102. In one embodiment, the first GUI module 116 retrieves query data describing one or more queries from the first storage 118 and generates graphical data for providing a GUI which depicts the one or more queries. An example of a GUI is shown in FIG. 4. The first GUI module 116 sends the graphical data to a first client 104, causing the first client 104 to present the GUI to the first user 102. The first user 102 answers the one or more queries depicted in the GUI and provides the answer data describing the one or more answers to the interface module 112. The interface module 112 sends the answer data to the intake module 201. In one embodiment, the intake module 201 stores the answer data in the first storage 118. In another embodiment, the intake module 201 sends the answer data to the determination module 203.

The determination module 203 is code and routines that, when executed by the processor 235, determines one or more matching products for a first user 102. In one embodiment, the determination module 203 receives the answer data from the intake module 201. The determination module 203 cross-references the matching data using the answer data and determines one or more matching products for a first user 102 based on the answer data. For example, the determination module 203 retrieves matching data from the first storage 118, compares the answer data to the matching data and determines one or more products described by the matching data that best matches the answer data.

In one embodiment, the determination module 203 stores product data describing the one or more matching products in the first storage 118. In another embodiment, the determination module 203 sends the product data to the first GUI module 116, causing the first GUI module 116 to generate graphical data for providing a GUI that depicts the one or more matching products. The first GUI module 116 sends the graphical data to the first client 104, causing the first client 104 to present the matching products to the first user 102 via the GUI. In yet another embodiment, the determination module 203 sends the product data to a recommendation module 535 which is described below with reference to FIGS. 5 and 18.

Figure 3:
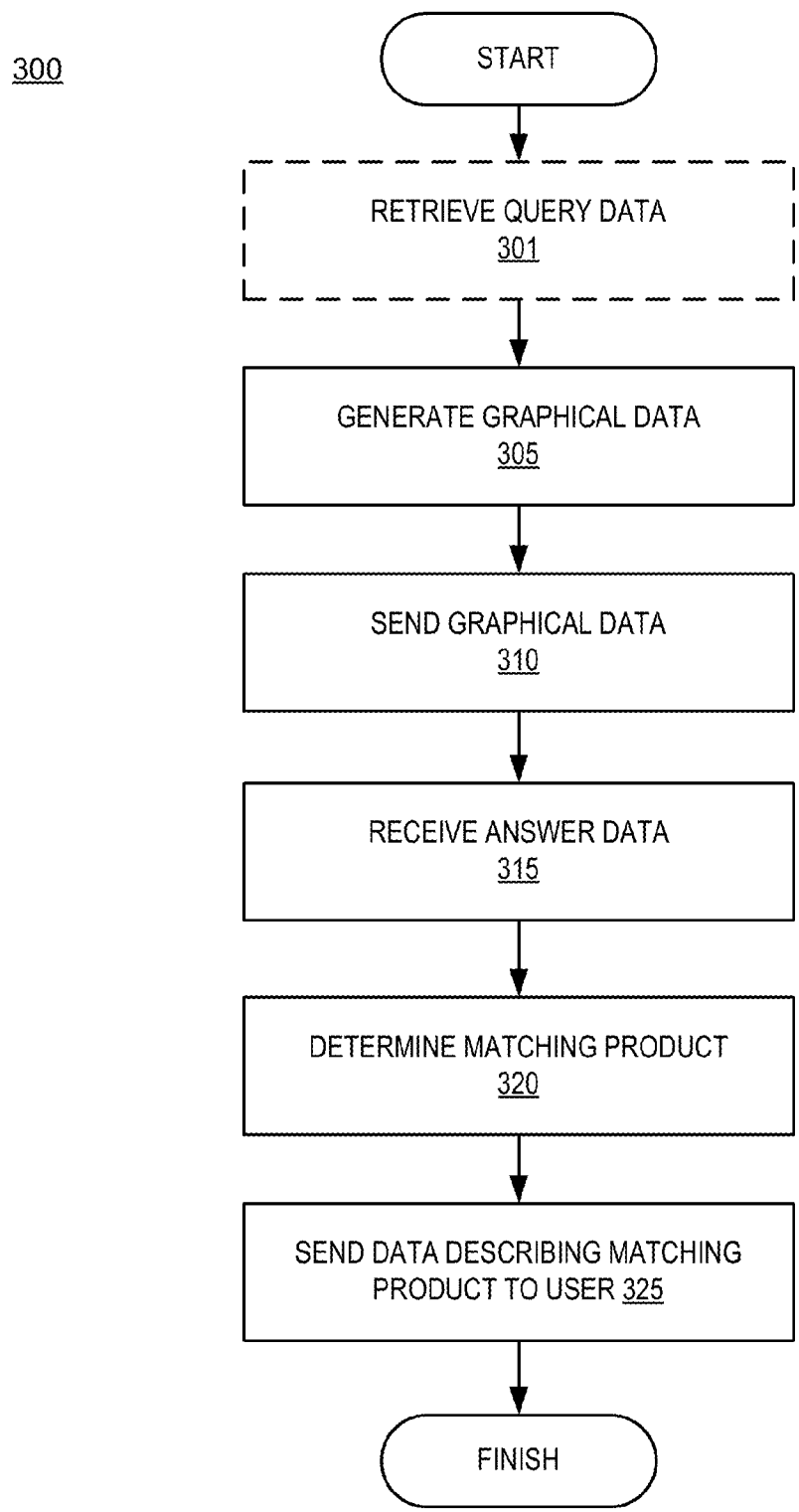
FIG. 3 is a flowchart illustrating a method for determining one or more matching products for a user according to one embodiment.

FIG. 3 is a flowchart illustrating a method 300 for determining one or more matching products for a first user 102 according to one embodiment. In the illustrated embodiment, the first GUI module 116 optionally retrieves 301 query data from the first storage 118. The first GUI module 116 generates 305 graphical data for providing a GUI that depicts one or more queries. In one embodiment, the first GUI module 116 generates the graphical data based on the query data. The first GUI module 116 sends 310 the graphical data to the interface module 112. The interface module 112 sends the graphical data to a first client 104, causing the first client 104 to present the GUI to the first user 102. The first user 102 submits one or more answers to the one or more queries via the GUI, causing the first client 104 to send answer data describing the one or more answers to the interface module 112 via the network 122. The intake module 201 receives 315 the answer data from the first client 104 via the interface module 112. The determination module 203 determines 320 one or more matching products for the first user 102 based on the answer data. The determination module 203 sends 325 product data describing the one or more matching products to the first client 104 via the interface module 112 and the network 122, causing the first client 104 to present the one or more matching products to the first user 102.

FIG. 4 is a graphical representation illustrating a GUI 400 for depicting one or more queries 402 according to one embodiment. In the illustrated embodiment, the one or more queries 402 request answers for a genre of music, a favorite artist, a price range, a color and a category for a headset, etc. The GUI 400 also includes a comment box 404 which allows a first user 102 to provide additional answer data. The first user 102 answers the one or more queries included in the GUI 400 and sends the answer data to the product matching module 114 by clicking on a "submit" button 450.

Figure 5:
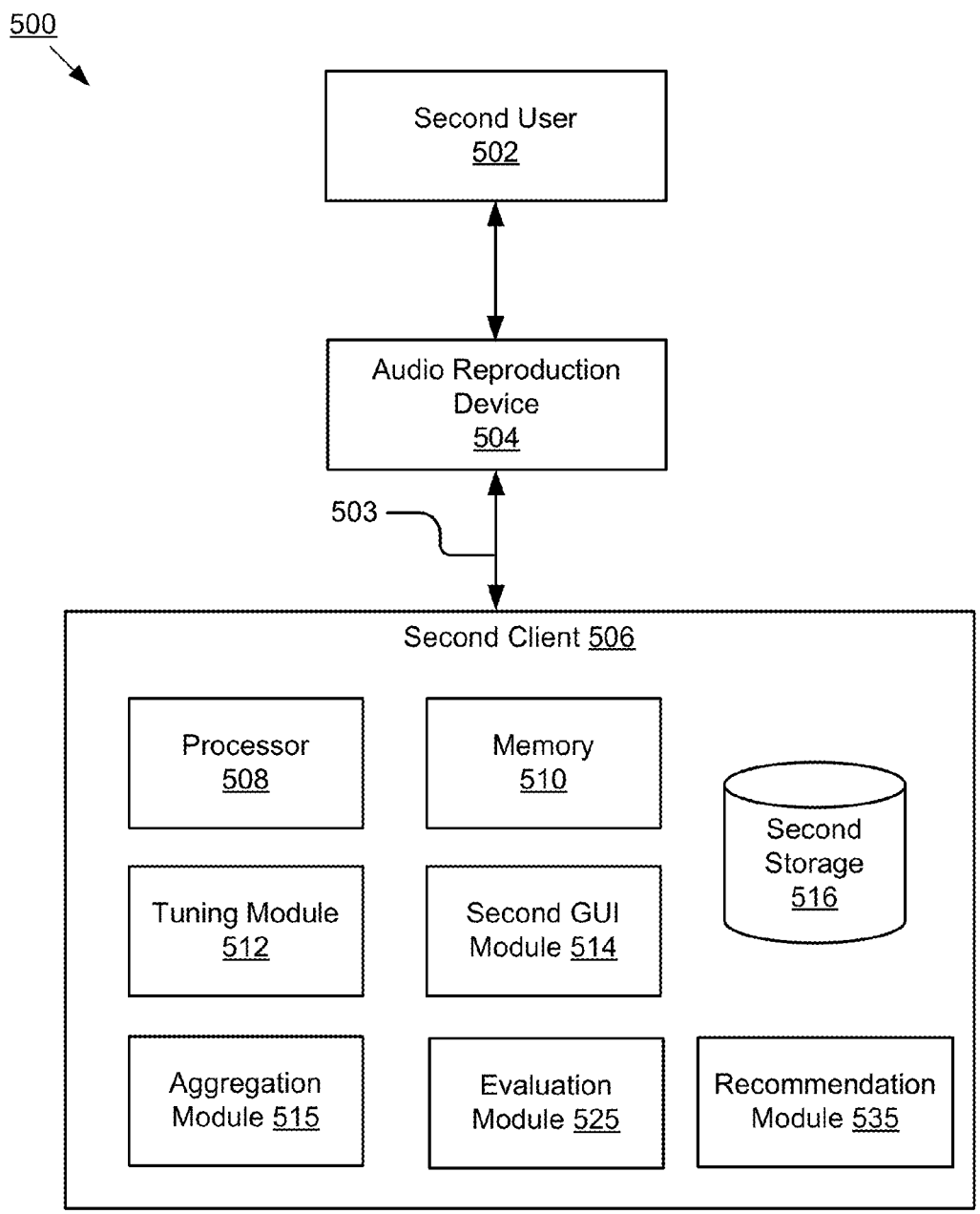
FIG. 5 is a high-level block diagram of a tuning system for tuning an audio reproduction device according to one embodiment.

FIG. 5 is a high-level block diagram of a tuning system 500 for tuning an audio reproduction device according to one embodiment. The example system 500 includes a second client 506 and an audio reproduction device 504 that interacts with a second user 502. The entities of the system 500 are communicatively coupled to each other. The audio reproduction device 504 is communicatively coupled to the second client 506 via signal line 503. Although only one audio reproduction device 504 and one second client 506 are shown in FIG. 5, the system 500 may include any number of audio reproduction devices 504 and/or any number of second clients 506. In one embodiment, the tuning system 500 tunes the audio reproduction device 504 to reproduce a sound wave that matches a target sound signature. In another embodiment, the tuning system 500 tunes the audio reproduction device 504 to reproduce a sound wave that matches a sound signature within a target sound range. The target sound signature and the target sound range are described below in more detail with reference to FIGS. 8, 9 and 21.

Figure 9:
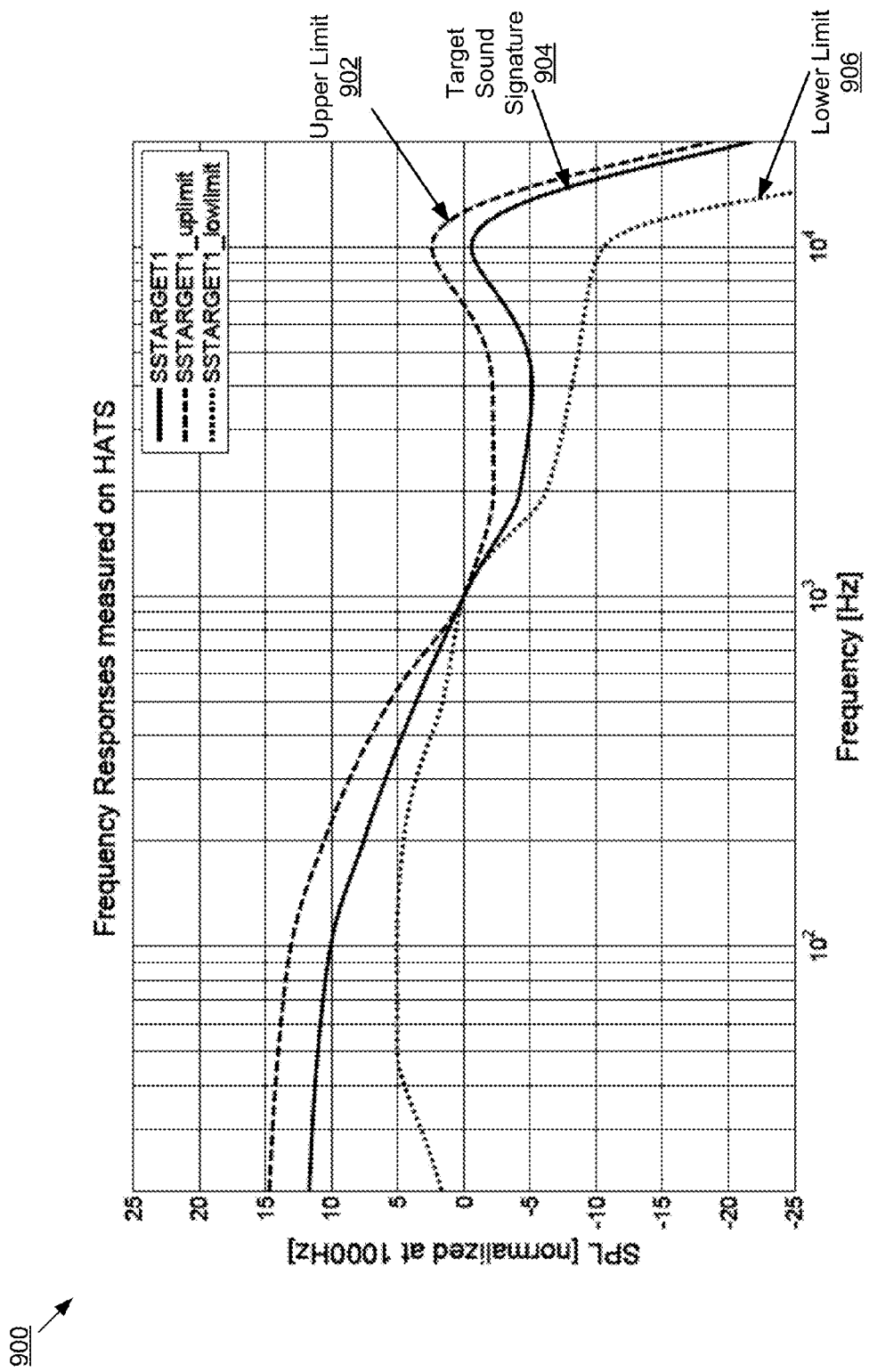
FIG. 9 is a graphical representation illustrating a target sound signature and a target sound range according to one embodiment.
Figure 21:
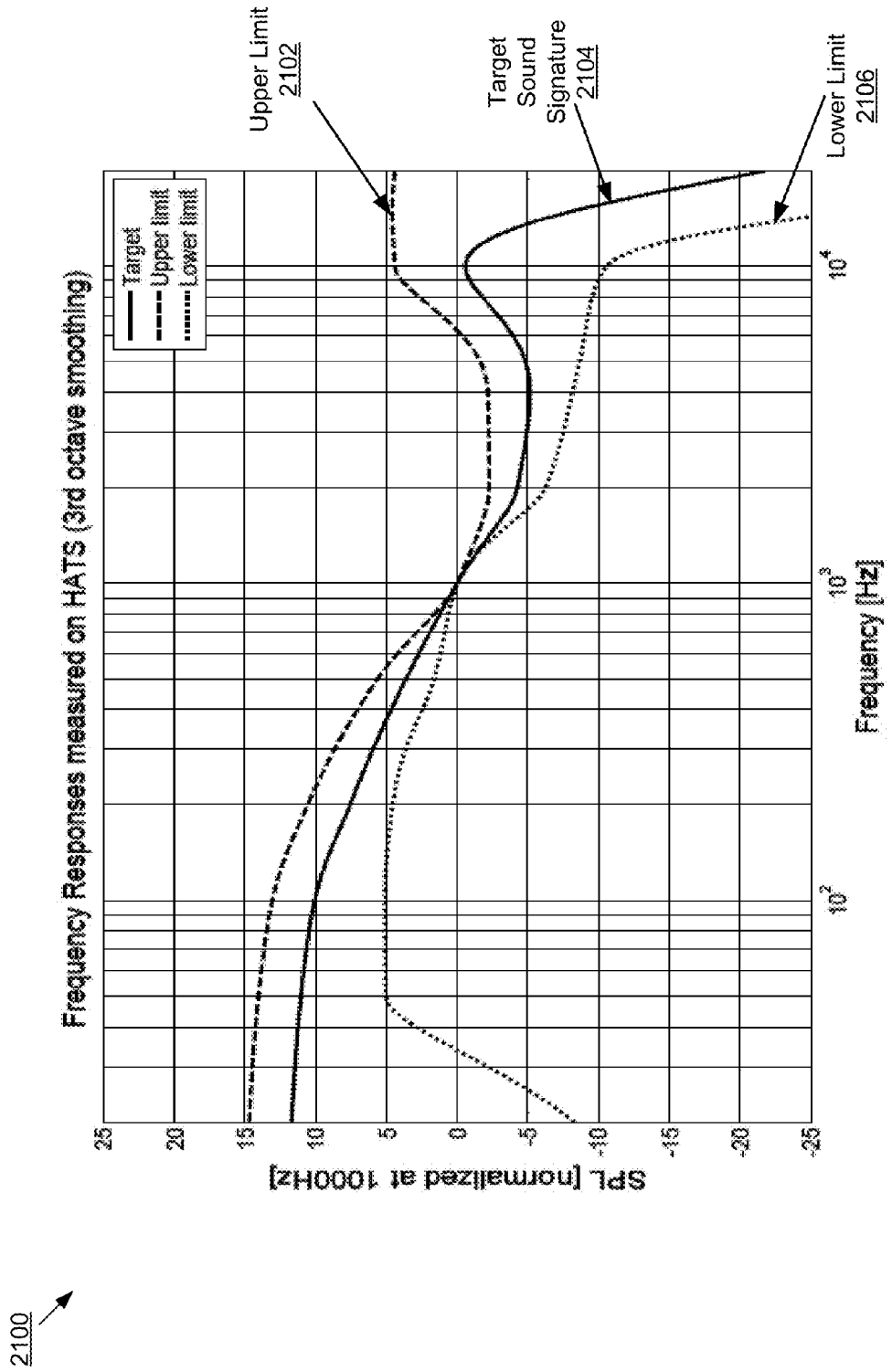
FIG. 21 is a graphical representation of a target sound signature and a target sound range according to another embodiment.

The audio reproduction device 504 is an apparatus for producing a sound wave from an audio signal. For example, the audio reproduction device 504 is a headphone device, an ear bud device, a speaker dock, an in-ear headphone device, a speaker device, etc. In one embodiment, the audio reproduction device 504 includes a cup, an ear pad coupled to a top edge of the cup, a driver coupled to the inner wall of the cup, and a microphone coupled to the wall of the cup. The audio reproduction device 504 is further described below with reference to FIGS. 6-7, 9 and 11-17. In one embodiment, the audio reproduction device 504 is configured to reproduce a sound wave that matches a target sound signature as illustrated in FIG. 9 or FIG. 21. In another embodiment, the audio reproduction device 504 is configured to reproduce a sound wave that matches a sound signature within a target sound range as illustrated in FIG. 9 or FIG. 21.

The second client 506 is any processor-based computing device capable of playback of audio files (MP3 files, AAC files, etc.). Examples of a second client 506 include, but are not limited to: an audio player (e.g., any MP3 player); a personal computer; a personal digital assistant; a television set-top box; a tablet computer; a smart phone; a cell phone; and a laptop computer, etc. In one embodiment, the second client 506 performs the functionality described above for the first client 104. A second user 502 interacts with the second client 506 and the audio reproduction device 504. The second user 502 is, for example, a human user. In one embodiment, the second user 502 is the same user as the first user 102. In another embodiment, the second user 502 is different from the first user 102.

In the illustrated embodiment, the second client 506 includes a processor 508, a memory 510, a tuning module 512, a second GUI module 514, an aggregation module 515, an evaluation module 525, a recommendation module 535 and a second storage device 516. The components of the second client 506 are communicatively coupled to each other. The aggregation module 515, the evaluation module 525 and the recommendation module 535 are described below in more detail with reference to FIG. 18.

The processor 508 has similar structures and provides similar functionality as the processor 235 described above. The memory 510 has similar structures and provides similar functionality as the memory 237 described above. The second storage 516 has similar structures and provides similar functionality as the first storage 118 described above. The description will not be repeated here. The second storage 516 is further described below in more detail with reference to FIGS. 8 and 18.

The tuning module 512 is code and routines that, when executed by the processor 508, tunes the audio reproduction device 504 to reproduce a sound wave. In one embodiment, the reproduced sound wave matches a target sound signature. In another embodiment, the reproduced sound wave matches a sound signature within a target sound range. In one embodiment, the tuning module 512 includes code and routines stored in an on-chip storage (not pictured) of the processor 508. In another embodiment, the tuning module 512 is implemented using hardware such as an FPGA or an ASIC. In yet another embodiment, the tuning module 512 is implemented using a combination of hardware and software. The tuning module 512 is described below with reference to FIGS. 8, 10A-10B, 18, 19 and 22.

The second GUI module 514 is code and routines that, when executed by the processor 508, generates graphical data for providing a GUI to a second user 502. For example, the second GUI module 514 receives data describing one or more suggestions from the tuning module 512 and generates graphical data for providing a GUI depicting the one or more suggestions. The second GUI module 514 sends the graphical data to a display (not pictured) communicatively coupled to the second client 506, causing the display to present the GUI to the second user 502. In one embodiment, the display is included in the second client 506. In other embodiments, the second GUI module 514 may generate any other graphical data for providing the functionality described herein.

Figure 6:
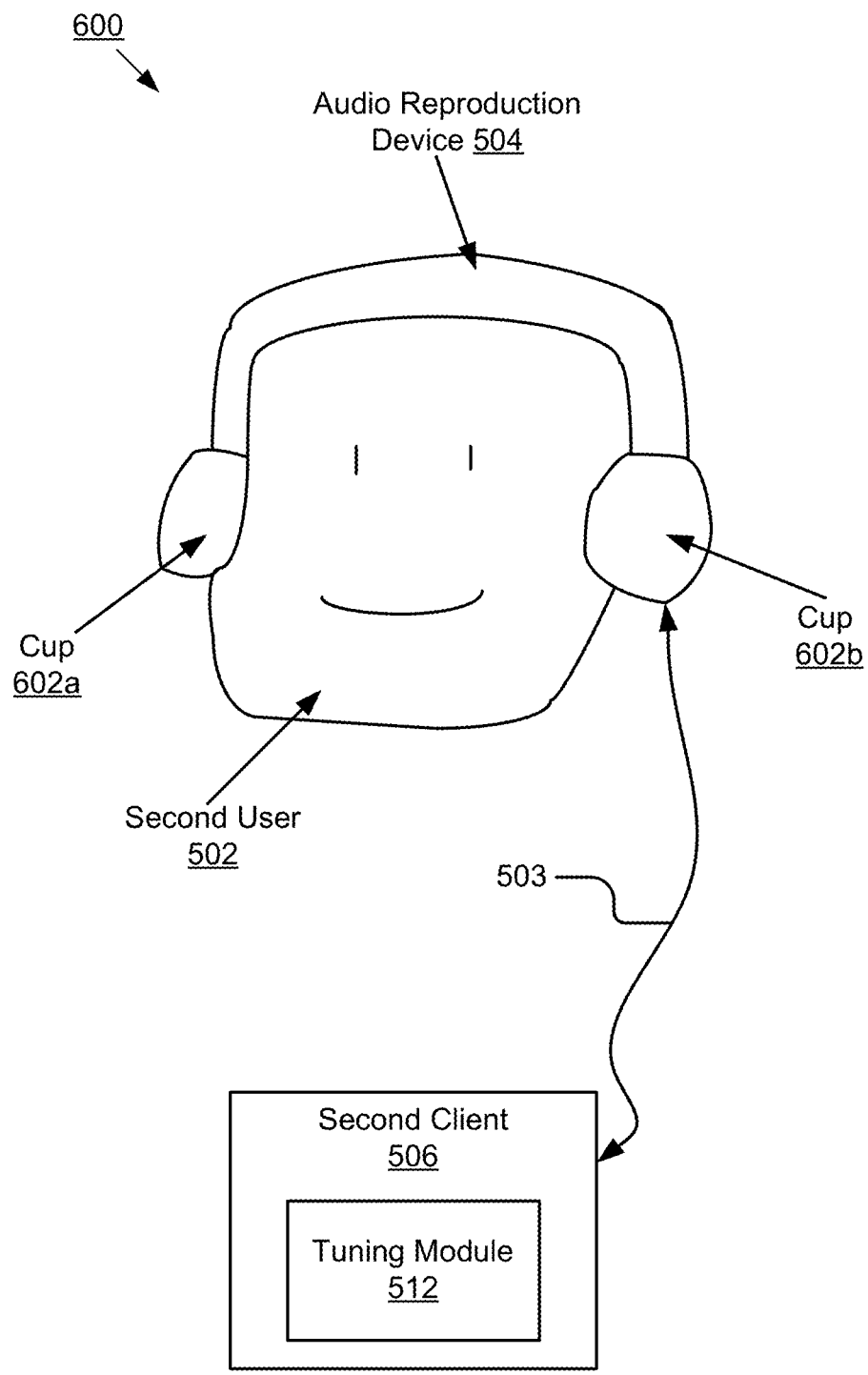
FIG. 6 is a graphical representation illustrating an example of a tuning system according to one embodiment.

FIG. 6 is a graphical representation 600 illustrating an example of a tuning system 500 according to one embodiment. In the illustrated embodiment, the audio reproduction device 504 includes one or more cups 602a and 602b (referred to individually or collectively as cup 602). In the depicted embodiment, the audio reproduction device 504 is a headphone device and the cups 602 are components of the headphone device. In one embodiment, the cup 602 is made in a variety of shapes such as a circular shape, an oval shape, a rectangular shape and any other shapes. In one embodiment, the cup 602 is a molded polymer or resin that houses a headphone driver for producing a sound wave from an audio signal. The cup 602 is further described below with reference to FIGS. 7 and 11-17.

The audio reproduction device 504 includes additional components that are not depicted in FIG. 6. However, a person having ordinary skill in the art will recognize that in FIG. 6 the audio reproduction device 504 is a headphone device. Further details of the headphone device are depicted with reference to FIGS. 11-17. These Figures provide details about a super-aural and a supra-aural headphone device. In one embodiment, the audio reproduction device 504 is an in-ear headphone device, an ear bud headphone device or a speaker dock or any other audio reproduction device.

Figure 7:
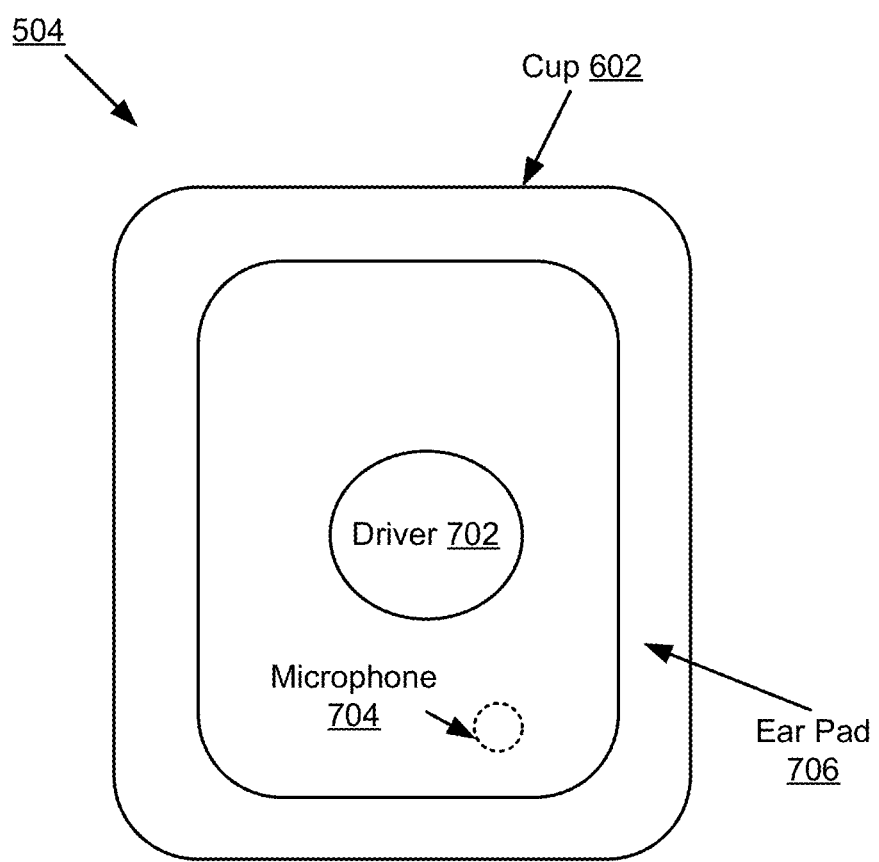
FIG. 7 is a block diagram illustrating a detailed view of an example audio reproduction device according to one embodiment.

FIG. 7 is a block diagram illustrating a detailed view of an example audio reproduction device 504 according to one embodiment. In the illustrated embodiment, the audio reproduction device 504 is configured to produce a sound wave that matches either a target sound signature or a sound signature within a target sound range as depicted in FIG. 9 or FIG. 21.

Figure 13:
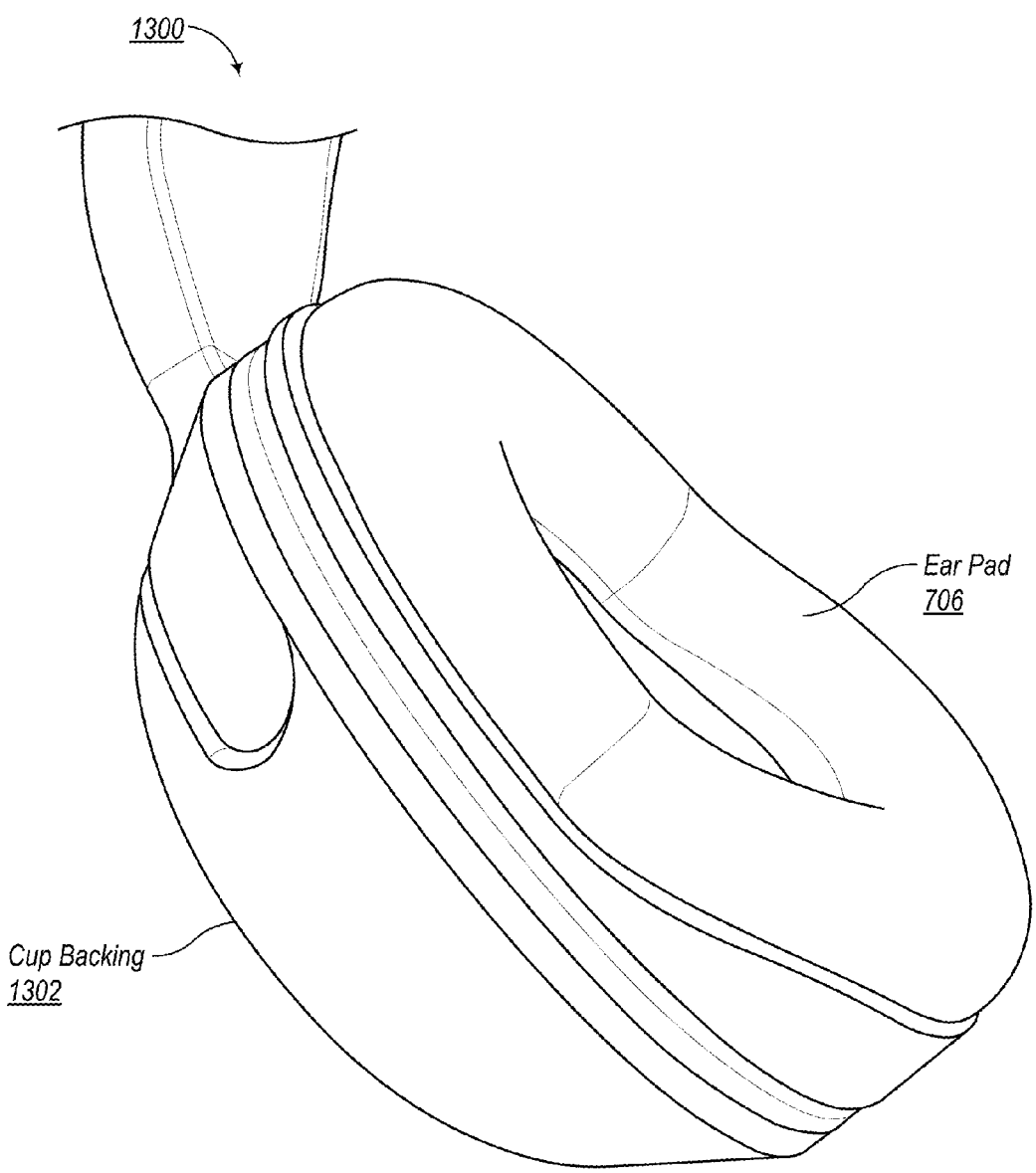
FIG. 13 is a graphical representation of a cup in an example audio reproduction device according to one embodiment.
Figure 15:
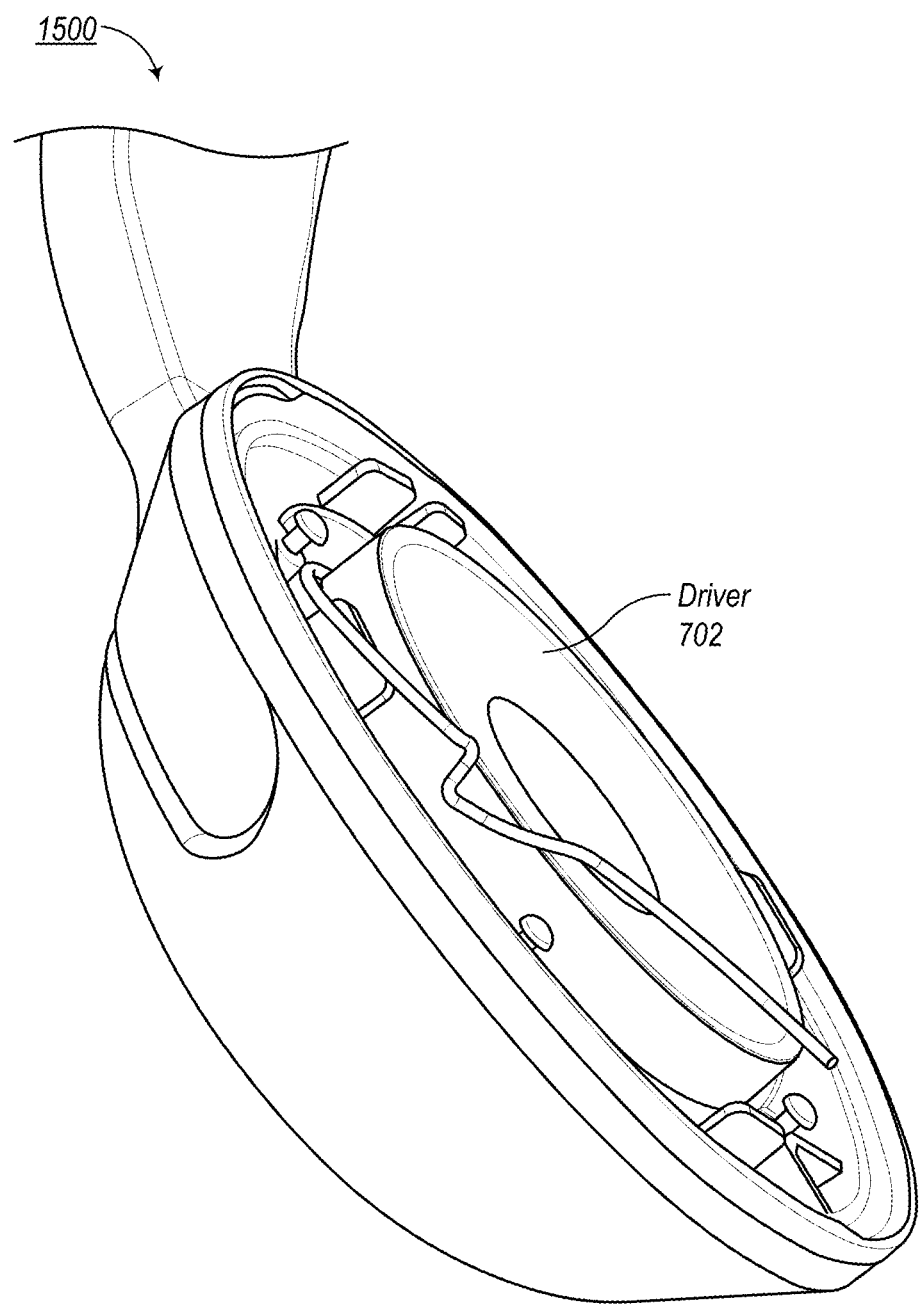
FIG. 15 is a graphical representation of an example driver mounted in a cup housing according to one embodiment.

The example audio reproduction device 504 includes a cup 602, a driver 702, an optional microphone 704 and an ear pad 706. The driver 702 is a device for reproducing a sound wave from an audio signal. An example driver 702 is shown in FIG. 15. The microphone 704 is a device for recording a sound wave generated by the driver 702 and generating a microphone signal that describes the sound wave. The microphone 704 transmits the microphone signal describing the sound wave to a microphone signal module of the tuning system described below with reference to FIG. 8 (element 803). In one embodiment, the microphone 704 is an inline microphone built into a wire that connects the audio reproduction device 504 to the second client 506. The ear pad 706 is a cushioned pad mounted on the cup 602. An example of an ear pad 706 is illustrated in FIG. 13.

Figure 8:
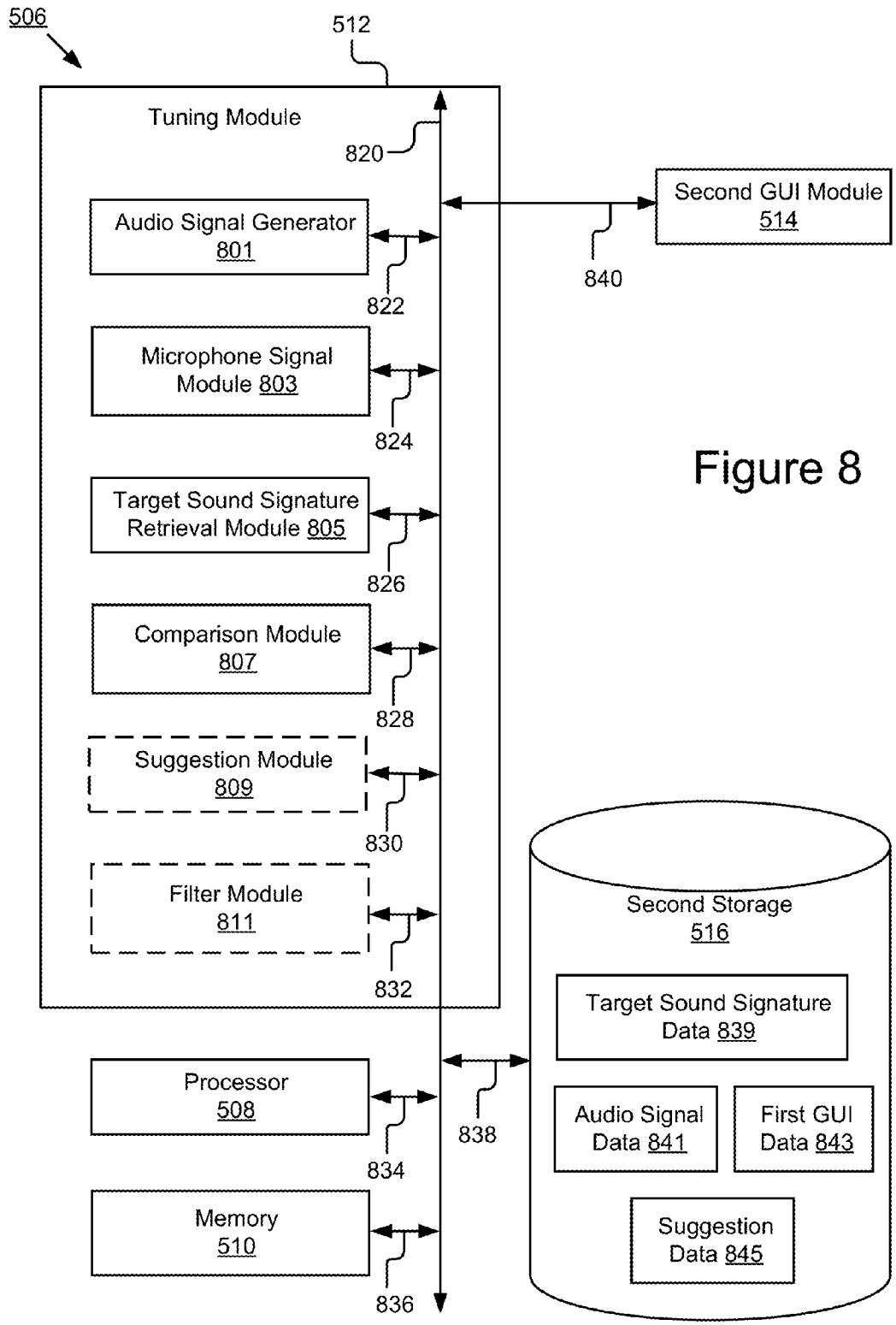
FIG. 8 is a block diagram illustrating a tuning module according to one embodiment.

FIG. 8 is a block diagram illustrating a tuning module 512 according to one embodiment. The components of the second client 506 are communicatively coupled to a bus 820. The second GUI module 514 is communicatively coupled to the bus 820 via signal line 840. The second storage 516 is communicatively coupled to the bus 820 via signal line 838. The processor 508 is communicatively coupled to the bus 820 via signal line 834. The memory 510 is communicatively coupled to the bus 820 via signal line 836.

In the illustrated embodiment, the tuning module 512 includes an audio signal generator 801, a microphone signal module 803, a target sound signature retrieval module 805, a comparison module 807, a suggestion module 809 and a filter module 811. The components of the tuning module 512 are communicatively coupled to each other. The suggestion module 809 and the filter module 811 are depicted using dashed lines to indicate that they are optional features of the tuning module 512.

The audio signal generator 801 is code and routines that, when executed by the processor 508, generates an audio signal. The audio signal generator 801 is communicatively coupled to the bus 820 via signal line 822. In one embodiment, the audio signal generator 801 retrieves the audio signal data 841 from the second storage 516 and generates an audio signal using the audio signal data 841. The audio signal data 841 is audio data used to generate an audio signal. The audio signal generator 801 sends the audio signal to the driver 702, causing the driver 702 to convert the audio signal to a sound wave. In one embodiment, the audio signal is configured to cause the audio reproduction device 504 to generate sound. The audio signal generator 801 sends the audio signal to an audio reproduction device 504 that converts the audio signal to a sound wave. In one embodiment, the sound wave has the same signature as a target sound signature. For example, the sound wave has the same sound pressure level as the target sound wave. In another embodiment, the sound wave has a sound signature within a target sound range. For example, the sound wave has a sound pressure level within the target sound range. In yet another embodiment, the signature of the sound wave is neither the same as a target sound signature nor within a target sound range. For example, the sound pressure level of the sound wave is outside the target sound range.

The microphone signal module 803 is code and routines that, when executed by the processor 508, receives a microphone signal from the microphone 704. The microphone signal module 803 is communicatively coupled to the bus 820 via signal line 824. In one embodiment, the microphone signal module 803 instructs the microphone 704 to record a sound wave when the driver 702 is converting an audio signal to the sound wave. The microphone 704 generates a microphone signal describing the sound wave and sends the microphone signal to the microphone signal module 803. In another embodiment, the microphone 704 is an inline microphone built into a wire that connects the audio reproduction device 504 to the second client 506. A user places the inline microphone close to the driver 702, causing the inline microphone to generate a microphone signal recording the sound wave generated by the driver 702. The microphone signal module 803 sends the microphone signal to the comparison module 807.

The target sound signature retrieval module 805 is code and routines that, when executed by the processor 508, retrieves target sound signature data 839 from the second storage 516. The target sound signature retrieval module 805 is communicatively coupled to the bus 820 via signal line 826. In one embodiment, the target sound signature data 839 is data describing a target sound signature and/or a sound signature within a target sound range. A sound signature is, for example, a sound pressure level of a sound wave. A target sound signature is a sound signature of a target sound wave that an audio reproduction device 504 aims to reproduce. For example, a target sound signature is a sound pressure level of a target sound wave. A target sound range is a range within which a target sound signature lies in. In one embodiment, a target sound range has a lower limit and an upper limit. Examples of a target sound signature and a target sound range are illustrated in FIGS. 9 and 21. In one embodiment, the target sound signature retrieval module 805 retrieves the target sound signature data 839 from the second storage 516 and sends the target sound signature data 839 to the comparison module 807.

The comparison module 807 is code and routines that, when executed by the processor 508, determines whether a microphone signal matches the target sound signature data 839. The comparison module 807 is communicatively coupled to the bus 820 via signal line 828. In one embodiment, the comparison module 807 determines whether a sound pressure level of the microphone signal is the same as the target sound signature. For example, the comparison module 807 measures values for the sound pressure level of the microphone signal at various frequencies and determines whether the values for the sound pressure level are the same as the target sound signature at various frequencies. If the microphone signal has the same sound pressure level as the target sound signature, the comparison module 807 determines that the microphone signal matches the target sound signature data 839.

If the microphone signal has a sound pressure level different from the target sound signature, then the comparison module 807 determines whether the microphone signal has a sound pressure level within a target sound range. For example, the comparison module 807 determines whether the values for the sound pressure level of the microphone signal are between a lower limit and an upper limit of the target sound range. If the microphone signal has a sound pressure level within the target sound range, the comparison module 807 determines that the microphone signal matches the target sound signature data 839. However, if the microphone signal has a sound pressure level outside the target sound range, the comparison module 807 determines that the microphone signal does not match the target sound signature data 839.

If the microphone signal matches the target sound signature data 839 indicating a sound wave generated by the audio reproduction device 504 matches either the target sound signature or a sound signature within the target sound range, the comparison module 807 determines that the audio reproduction device 504 does not need to be tuned. However, if the microphone signal does not match the target sound signature data 839, in one embodiment the comparison module 807 determines differences between the microphone signal and a target sound signature. For example, the comparison module 807 determines differences between a first frequency response of the microphone signal and a second frequency response of the target sound signature. In another example, the comparison module 807 determines differences between a sound pressure level of the microphone signal and the target sound signature at various frequencies. In another embodiment, the comparison module 807 determines differences between the microphone signal and a sound signature within a target sound range. In either embodiment, the comparison module 807 sends the determined differences to the filter module 811. The comparison module 807 generates a mismatching signal and sends the mismatching signal to the suggestion module 809.

The suggestion module 809 is code and routines that, when executed by the processor 508, provides one or more suggestions to a second user 502. The suggestion module 809 is communicatively coupled to the bus 820 via signal line 830. In one embodiment, the suggestion module 809 receives a mismatching signal from the comparison module 807 and generates one or more suggestions responsive to the mismatching signal. For example, the suggestion module 809 retrieves suggestion data 845 from the second storage 516 and generates one or more suggestions based on the retrieved suggestion data 845. The suggestions are instructions for assisting the second user 502 to adjust the audio reproduction device 504 so that a better sound quality is achieved in the audio reproduction device 504. For example, the suggestions are directions for repositioning the audio reproduction device 504 on the user's head so that a better seal is formed and the target sound signature is achieved. The suggestion module 809 sends the one or more suggestions to the second GUI module 514, causing the second GUI module 514 to generate graphical data for providing a GUI that depicts the one or more suggestions to the second user 502.

Examples of a suggestion include, but are not limited to, adjusting a position of a cup 602, reconnecting the audio reproduction device 504 to a second client 506, etc. In other embodiments, other suggestions are possible.

The filter module 811 is code and routines that, when executed by the processor 508, filters audio signals. The filter module 811 is communicatively coupled to the bus 820 via signal line 832. In one embodiment, the filter module 811 receives the microphone signal from the microphone module 803 and the determined differences between the microphone signal and a target sound signature or a sound signature within a target sound range from the comparison module 807. The filter module 811 retrieves target sound signature data 839 describing a target sound signature or a sound signature within a target sound range from the second storage 516.

In one embodiment, the filter module 811 creates a digital filter based on one or more of the microphone signal, the target sound signature, the target sound range and the determined differences between the microphone signal and the target sound signature or a sound signature within the target sound range. The audio signal filtered by the digital filter causes the driver 702 to reproduce a sound wave that either matches the target sound signature or a sound signature within the target sound range. For example, the filter module 811 creates a digital filter so that when an audio signal is inputted to the digital filter, a filtered audio signal is generated whose corresponding sound wave reproduced by the audio reproduction device 504 matches either the target sound signature or a sound signature within the target sound range. In other words, the filter module 811 creates a digital filter and applies the digital filter to emulate a target sound signature or a sound signature within a target sound range, so that a sound wave reproduced by the audio reproduction device 504 either matches the target sound signature or a sound signature within the target sound range. The filter module 811 is further described below with reference to FIG. 18.

The second storage 516 stores data that includes target sound signature data 839, audio signal data 841, first GUI data 843 and suggestion data 845. The target sound signature data 839 and the audio signal data 841 are described above. The first GUI data 843 is graphical data for providing one or more GUIs to a second user 502. For example, the first GUI data 843 includes graphical data for providing a GUI that depicts one or more suggestions. The suggestion data 845 is data describing one or more suggestions. Example suggestions are described above.

FIG. 9 is a graphical representation 900 illustrating a target sound signature and a target sound range according to one embodiment. FIG. 9 depicts a target sound signature 904 (e.g., a sound pressure level (SPL) of a target sound wave) normalized at 1,000 hertz (Hz). FIG. 9 also includes an upper limit 902 and a lower limit 906 for the target sound signature 904. In the illustrated embodiment, a target sound range is a range between the upper limit 902 and the lower limit 906. In the depicted embodiment, the frequency responses are measured using the Head and Torso Simulator (HATS) manufactured by Bruel & Kjaer. In one embodiment, capture of acoustic data is performed using SoundCheck manufactured by Listen, Inc. Another example target sound signature and target sound range are illustrated with reference to FIG. 21.

FIG. 21 is a graphical representation 2100 illustrating a target sound signature and a target sound range according to another embodiment. FIG. 21 depicts a second example of a target sound signature 2104 (e.g., a sound pressure level of a target sound wave) normalized at 1,000 hertz (Hz). FIG. 21 also includes an upper limit 2102 and a lower limit 2106 for the target sound signature 2104. In the illustrated embodiment, a target sound range is the range between the upper limit 2102 and the lower limit 2106.

Figure 10A:
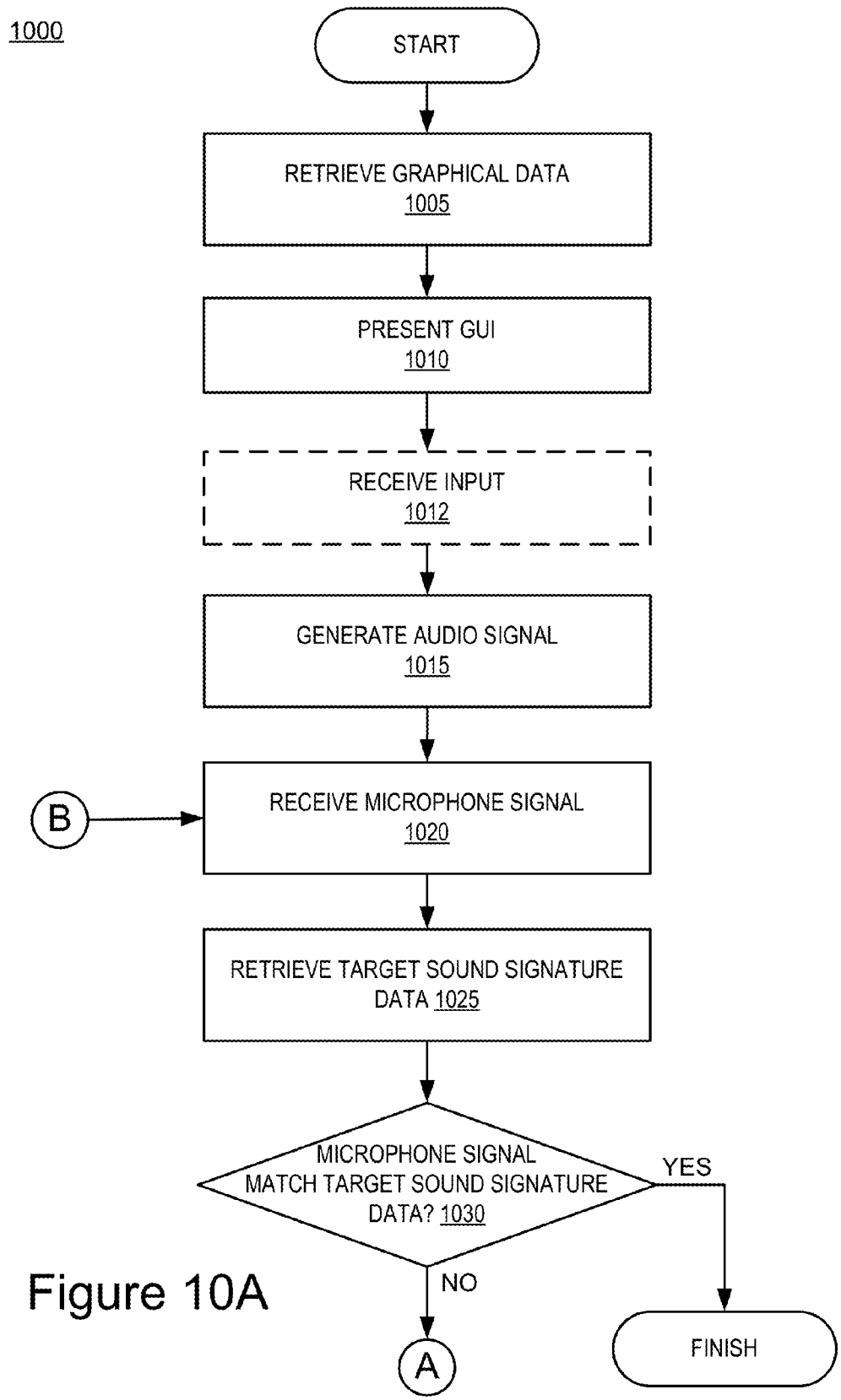
FIGS. 10A and 10B are flowcharts illustrating a method for tuning an audio reproduction device according to one embodiment.
Figure 10B:
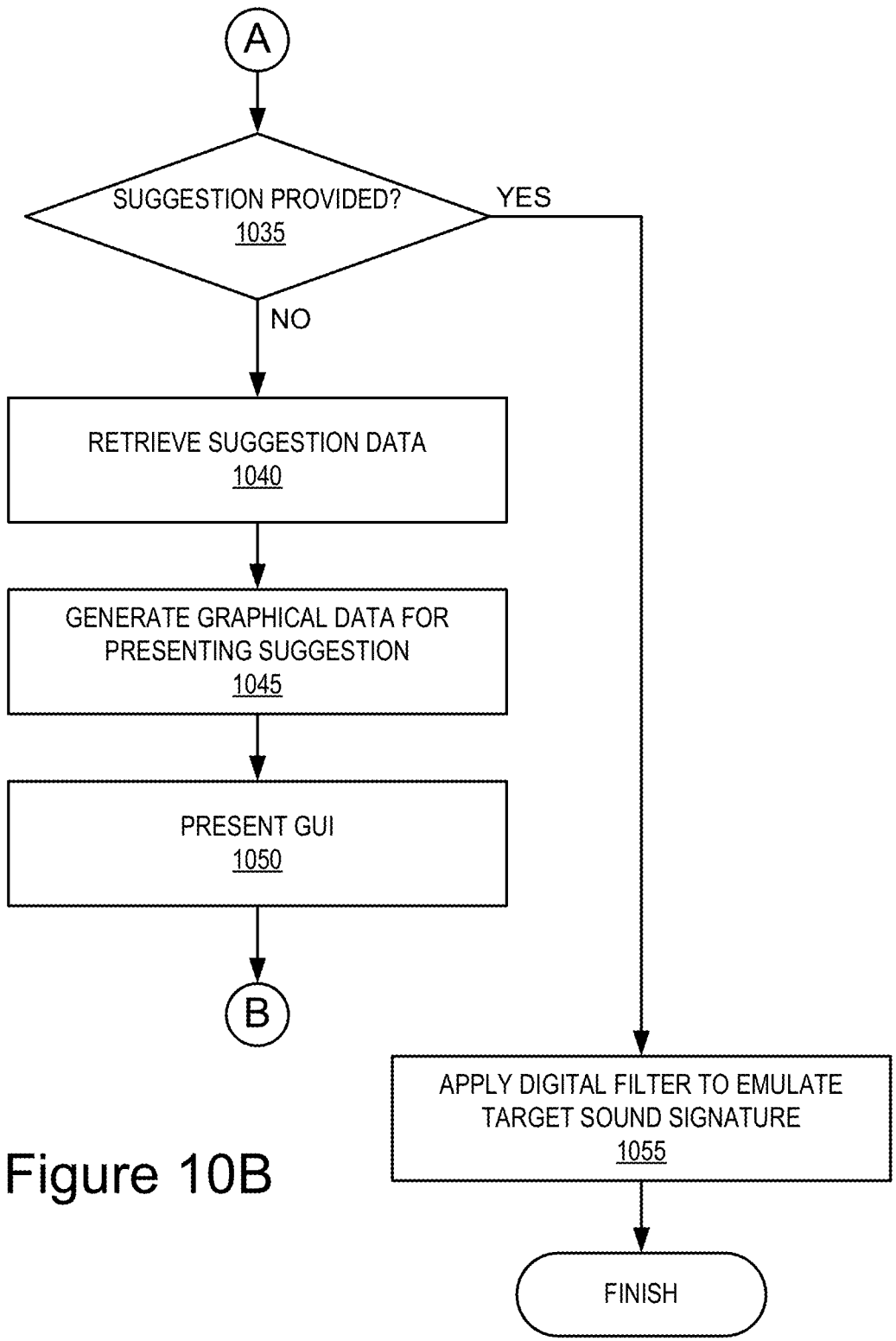

FIGS. 10A and 10B are flowcharts illustrating a method 1000 for tuning an audio reproduction device 504 according to one embodiment. Referring to FIG. 10A, the second GUI module 514 retrieves 1005 first GUI data 843 from the second storage 516 and sends the first GUI data 843 to a display (not pictured) for presenting 1010 a GUI to the second user 502. In one embodiment, the GUI depicts a message that notifies the second user 502 that the audio quality of the audio reproduction device 504 is going to be tested. Optionally, the second user 502 provides an input by clicking on a "test" button included in the GUI and testing begins afterwards.

Optionally, the audio signal generator 801 receives 1012 an input from the second user 502. The audio signal generator 801 retrieves audio signal data 841 from the second storage 516 and generates 1015 an audio signal. In one embodiment, the audio signal generator 801 generates an audio signal using the audio signal data 841 and sends the audio signal to the driver 702. The driver 702 converts the audio signal to a sound wave. The microphone 704 records the sound wave and generates a microphone signal describing the sound wave. The microphone signal module 803 receives 1020 the microphone signal from the microphone 704 and sends the microphone signal to the comparison module 807.

The target sound signature retrieval module 805 retrieves 1025 target sound signature data 839 from the second storage 516. The target sound signature retrieval module 805 sends the target sound signature data 839 to the comparison module 807. The comparison module 807 determines 1030 whether the microphone signal matches the target sound signature data 839. If the microphone signal matches the target sound signature data 839, the method 1000 ends. Otherwise, the method 1000 moves to step 1035.

Referring to FIG. 10B, the suggestion module 809 determines 1035 whether one or more suggestions have been provided to the second user 502. If one or more suggestions have been provided to the second user 502, the method 1000 moves to step 1055. Otherwise, the method 1000 moves to step 1040. Turning to step 1040, the suggestion module 809 retrieves suggestion data 845 from the second storage 516 and generates one or more suggestions from the suggestion data 845. The suggestion module 809 sends the one or more suggestions to the second GUI module 514. The second GUI module 514 generates 1045 graphical data for providing a GUI depicting the one or more suggestions. The second GUI module 514 sends the graphical data to a display (not pictured) for presenting 1050 the GUI to the second user 502. The method 1000 then moves to step 1020.

Turning to step 1055, the filter module 811 applies a digital filter to emulate a target sound signature or a sound signature within a target sound range. For example, the filter module 811 filters audio signals using the digital filter before sending the audio signals to the audio reproduction device 504 for playback, where the filtered audio signals cause the audio reproduction device 504 to reproduce a sound wave that matches either the target sound signature or a sound signature within the target sound range.

Figure 11:
FIG. 11 is a graphical representation of an example audio reproduction device according to one embodiment.
Figure 12:
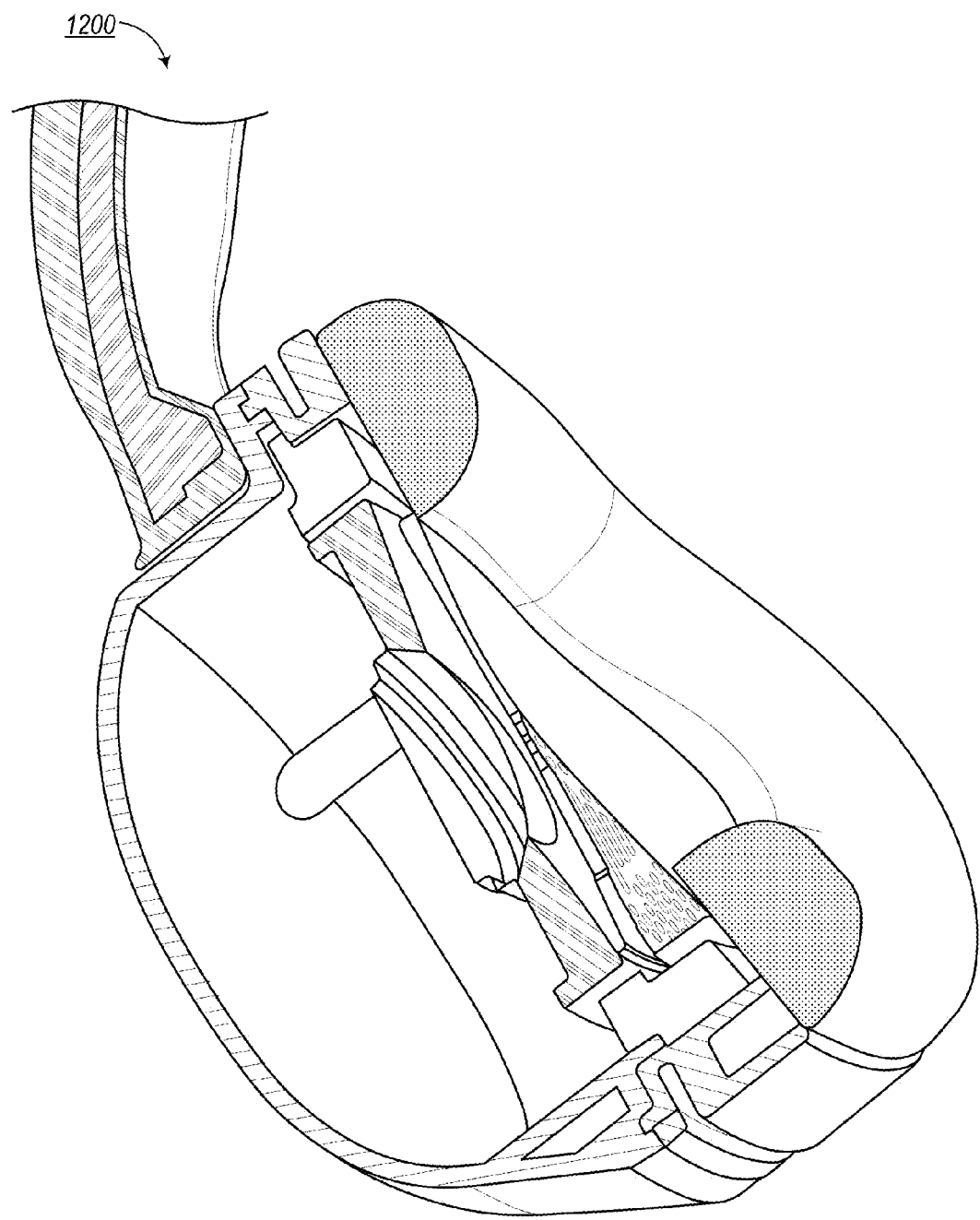
FIG. 12 is a cross-sectional view of a cup assembly in an example audio reproduction device according to one embodiment.
Figure 14:
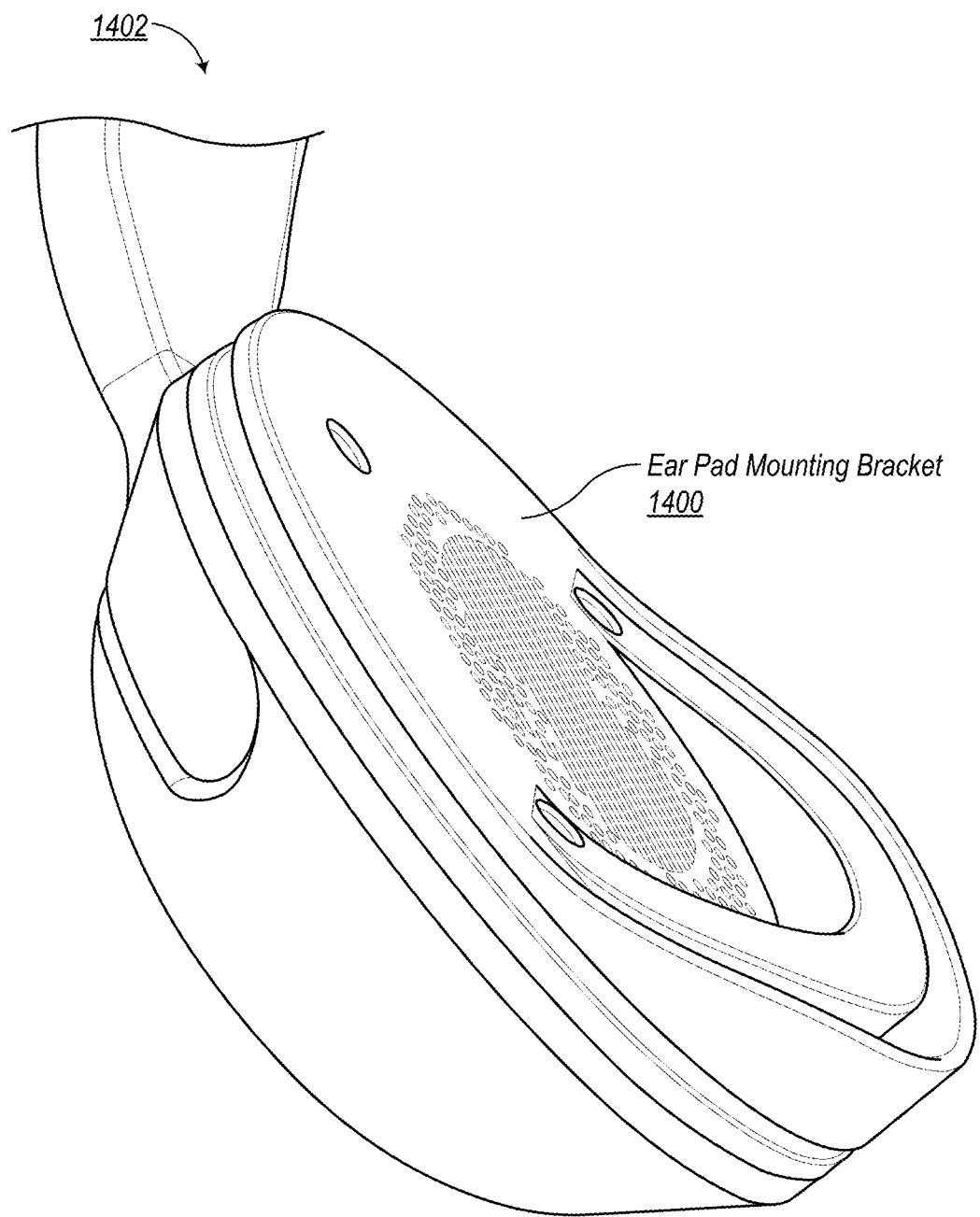
FIG. 14 is a graphical representation of an ear pad mounting bracket of an example audio reproduction device according to one embodiment.
Figure 16:
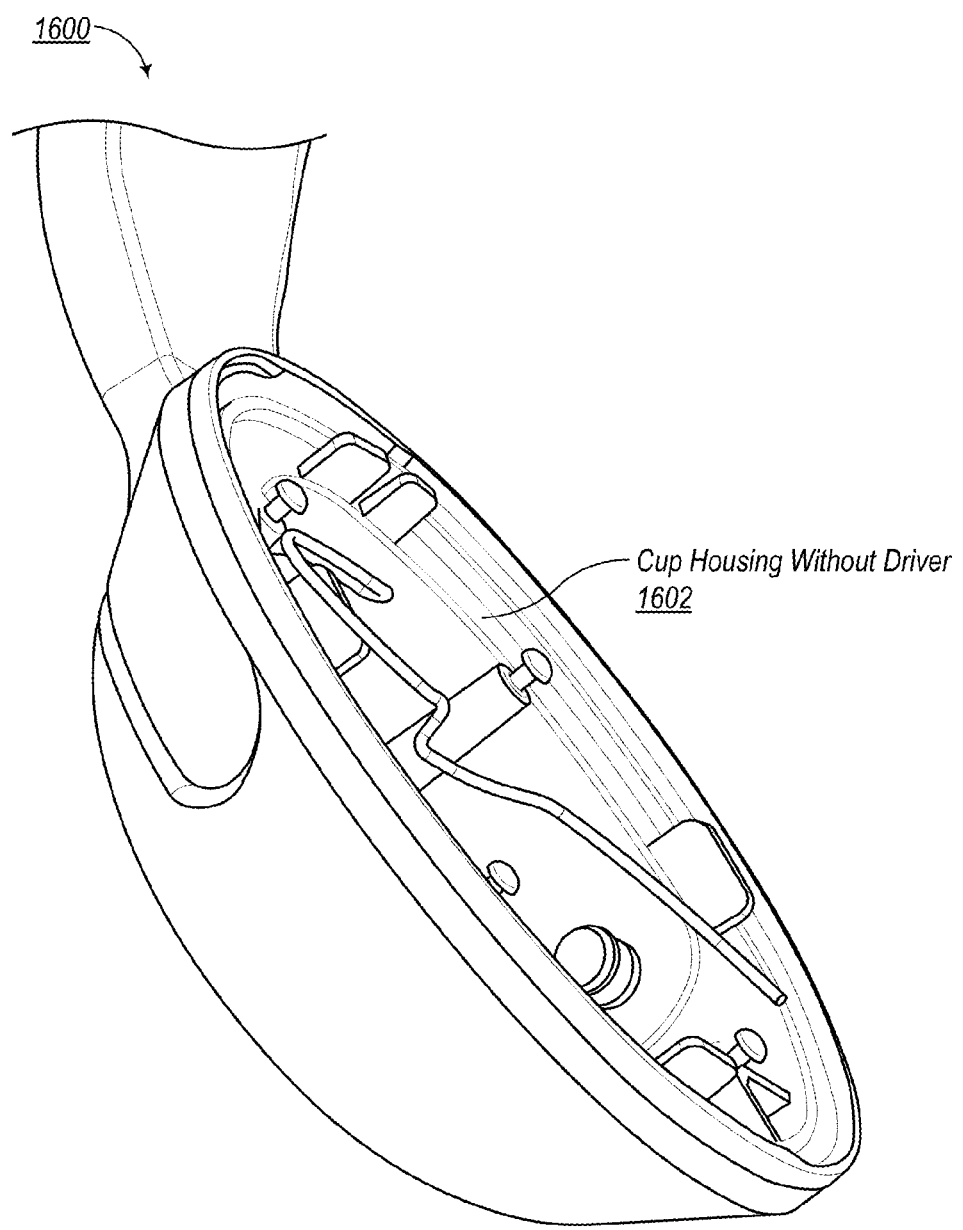
FIG. 16 is a graphical representation of a cup housing without a driver according to one embodiment.
Figure 17:
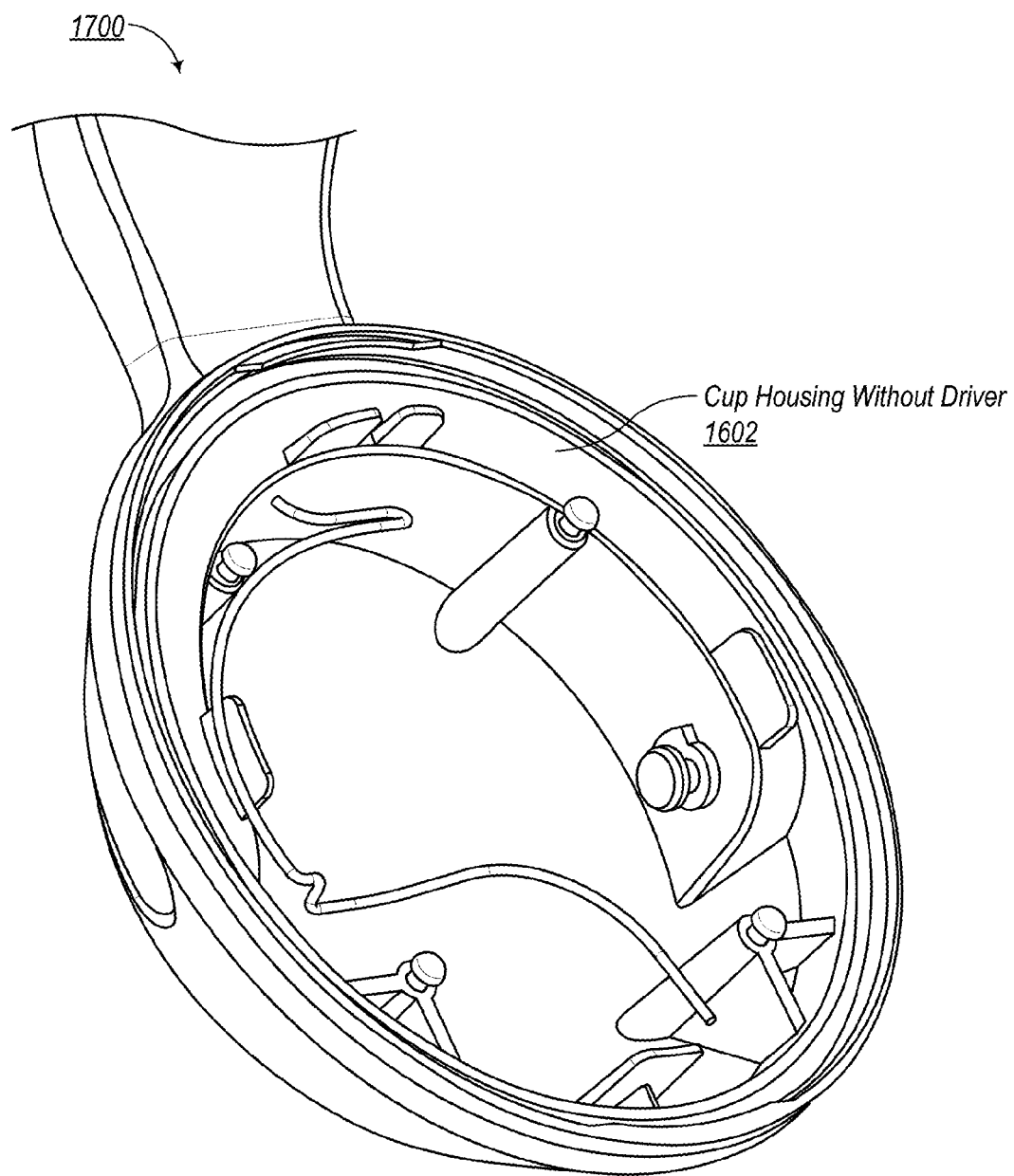
FIG. 17 is a graphical representation of a cup housing without a driver according to another embodiment.

FIGS. 11-17 are graphical representations illustrating example audio reproduction devices 504 according to various embodiments. FIG. 11 is a graphical representation 1100 of an example audio reproduction device 504 according to one embodiment. FIG. 12 is a cross-sectional view 1200 of a cup assembly of an example audio reproduction device 504 according to one embodiment. FIG. 13 is a graphical representation 1300 of a cup 602 in an example audio reproduction device 504 according to one embodiment. The cup 602 includes a cup backing 1302 and an example ear pad 706. FIG. 14 is a graphical representation 1402 of an ear pad mounting bracket 1400 in an example audio reproduction device 504 according to one embodiment. FIG. 15 is a graphical representation 1500 of an example driver 702 mounted in a cup housing according to one embodiment. FIG. 16 is a graphical representation 1600 of a cup housing 1602 without a driver 702 according to one embodiment. FIG. 17 is a graphical representation 1700 of a cup housing 1602 without a driver 702 according to another embodiment.

Figure 18:
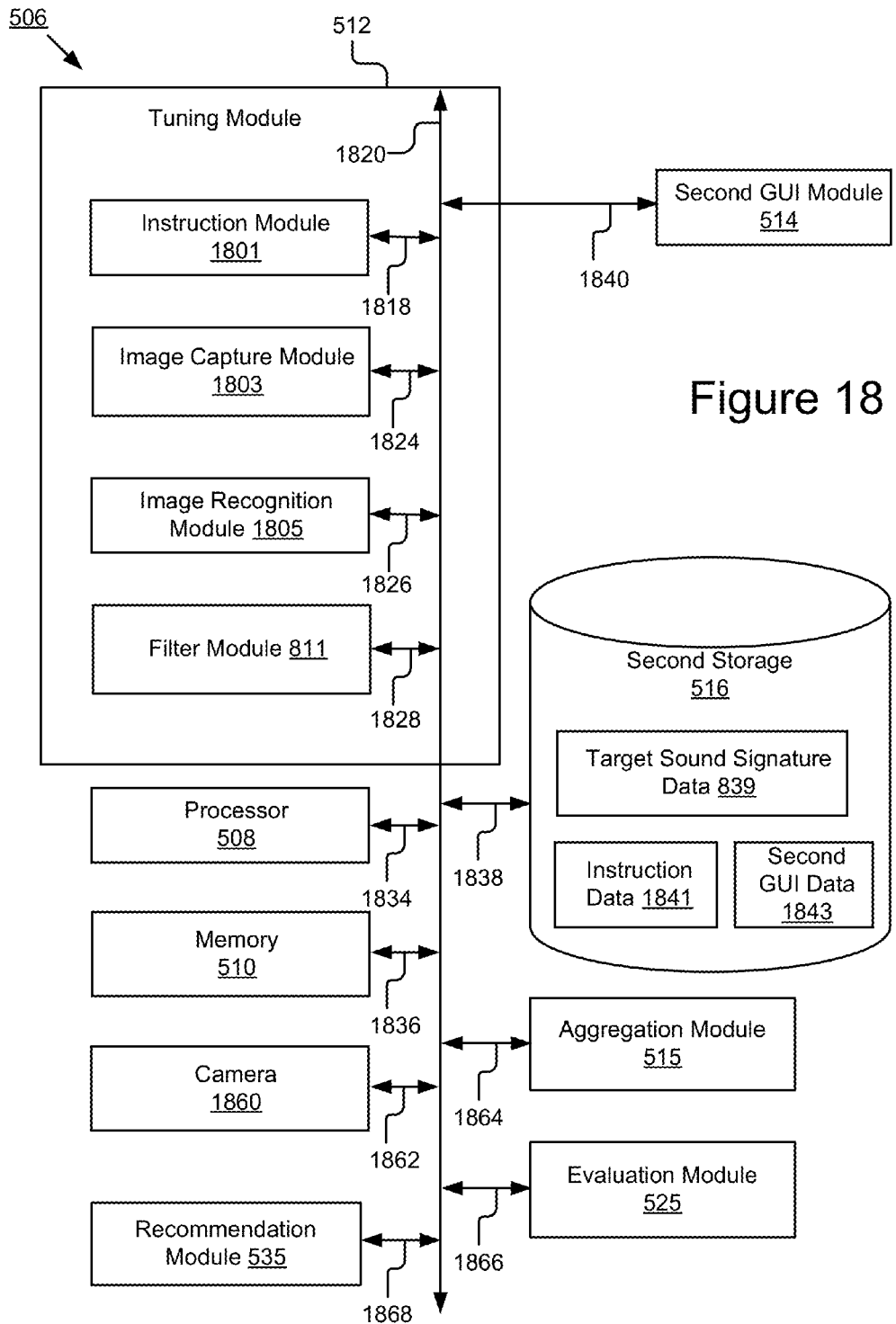
FIG. 18 is a block diagram illustrating a tuning module according to another embodiment.

FIG. 18 is a block diagram illustrating a tuning module 512 according to another embodiment. In the illustrated embodiment, the second client 506 additionally includes a camera 1860. The components of the second client 506 are communicatively coupled to a bus 1820. The second GUI module 514 is communicatively coupled to the bus 1820 via signal line 1840. The second storage 516 is communicatively coupled to the bus 1820 via signal line 1838. The processor 508 is communicatively coupled to the bus 1820 via signal line 1834. The memory 510 is communicatively coupled to the bus 1820 via signal line 1836. The camera 1860 is communicatively coupled to the bus 1820 via signal line 1862. The recommendation module 535 is communicatively coupled to the bus 1820 via signal line 1868. The aggregation module 515 is communicatively coupled to the bus 1820 via signal line 1864. The evaluation module 525 is communicatively coupled to the bus 1820 via signal line 1866.

The camera 1860 is an optical device for recording images. For example, the camera 1860 records an image that depicts a user (e.g., a first user 102 or a second user 502) wearing a beanie and a headset over the beanie. In another example, the camera 1860 records an image of a user that has long hair and wears a headset over the head. The camera 1860 sends image data describing the image to the tuning module 512.

In the illustrated embodiment, the tuning module 512 includes an instruction module 1801, an image capture module 1803, an image recognition module 1805 and a filter module 811. These components of the tuning module 512 are communicatively coupled to the bus 1820.

The instruction module 1801 is code and routines that, when executed by the processor 508, determines one or more instructions for a user. The instruction module 1801 is communicatively coupled to the bus 1820 via signal line 1818. In one embodiment, the instruction module 1801 receives an input to initiate the tuning module 512. For example, the instruction module 1801 receives a signal from the second client 506 indicating to launch the tuning module 512 on the second client 506.

Figure 26A:
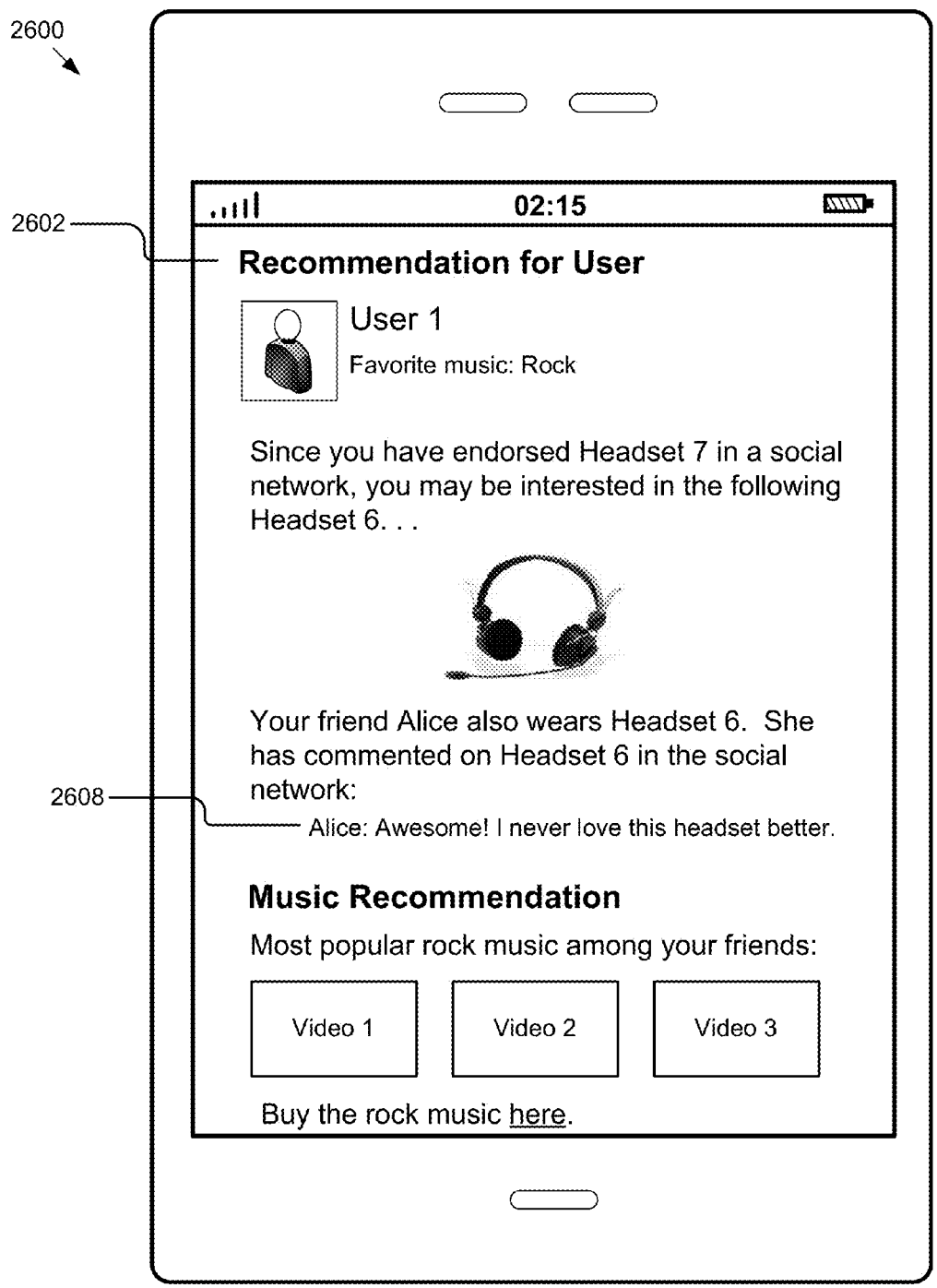
FIG. 26A is a graphical representation illustrating a user interface for providing recommendation to a user according to one embodiment.
Figure 26B:
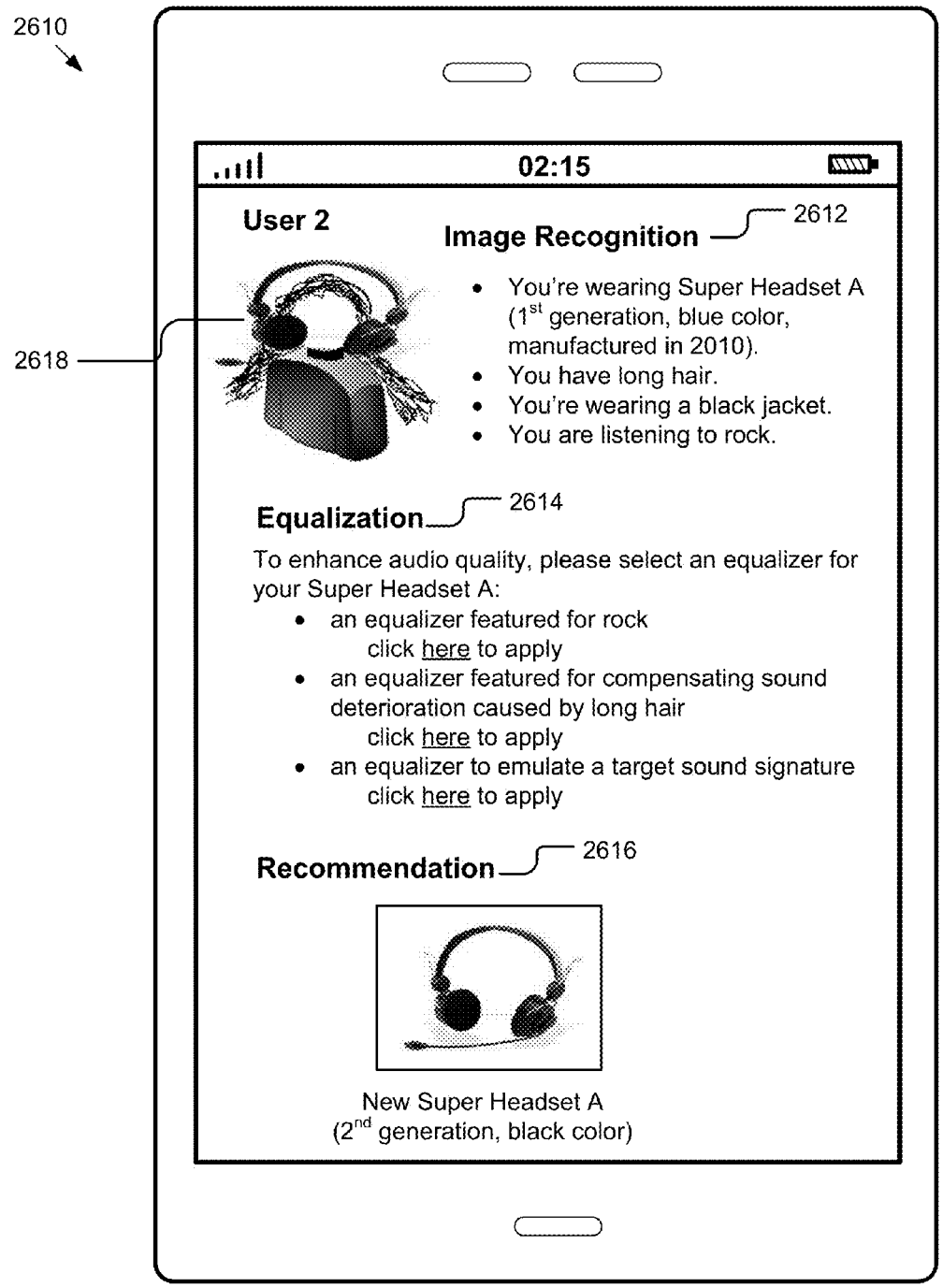
FIG. 26B is a graphical representation illustrating a user interface for interacting with a user that uses an audio reproduction device according to one embodiment.
Figure 26C:
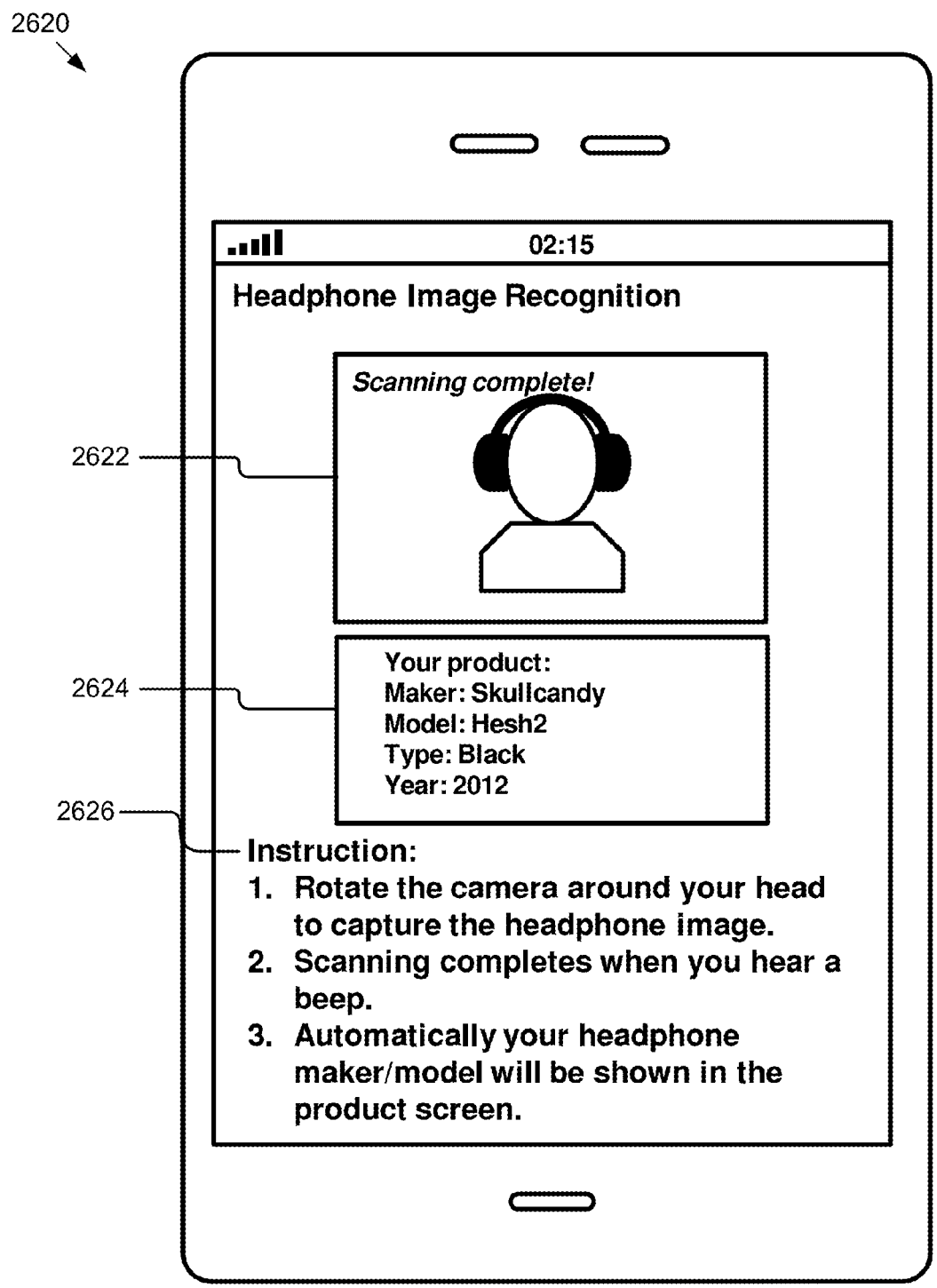
FIG. 26C is a graphical representation illustrating a user interface for capturing an image according to one embodiment.

The instruction module 1801 determines one or more instructions for a user so that the user can follow the instructions to take one or more images using the camera 1860. For example, an instruction informs a user to wear his or her headphones and to rotate the camera 1860 around his or her head so that images depicting the headphones are automatically captured by the camera 1860. In another example, an instruction instructs a user to take a snapshot of each side of his or her head (e.g., left, right, front and back) while the user is wearing an audio reproduction device 504. In yet another example, an instruction instructs a user to take a snapshot depicting a logo of the audio reproduction device 504 worn by the user. In still yet another example, an instruction informs a user to wear his or her audio reproduction device 504 and to face in front of the camera 1860 so that the camera 1860 can automatically take a snapshot for the user. Additional example instructions are illustrated in FIG. 26C.

The instruction module 1801 sends the instructions to the user. For example, the instruction module 1801 sends instruction data describing the instructions to the second GUI module 514, causing the second GUI module 514 to generate graphical data for providing a user interface that depicts the instructions. The second GUI module 514 sends the graphical data to the second client 506, causing the second client 506 to present the instructions to the user via the user interface.

The image capture module 1803 is code and routines that, when executed by the processor 508, captures one or more images. The image capture module 1803 is communicatively coupled to the bus 1820 via signal line 1824. In one embodiment, a user takes an image using the camera 1860 by following one or more instructions presented in a user interface. In another embodiment, the image capture module 1803 instructs the camera 1860 to automatically take a snapshot of a user after the instruction module 1801 presents the instructions to the user. The camera 1860 sends image data describing the image to the image capture module 1803. In one embodiment, the image capture module 1803 stores the image data in the second storage 516. In another embodiment, the image capture module 1803 sends the image data to the image recognition module 1805.

The image recognition module 1805 is code and routines that, when executed by the processor 508, performs image recognition on one or more images. The image recognition module 1805 is communicatively coupled to the bus 1820 via signal line 1826. In one embodiment, the image recognition module 1805 applies one or more image recognition techniques (e.g., neural networks, image processing techniques, computer vision techniques, machine learning techniques, etc.) to the image data describing an image and extracts recognition data from the image. For example, the image recognition module 1805 performs image recognition on the captured image and determines which headset is depicted in the image. In another example, the image recognition module 1805 performs image recognition on the image and determines that a user is wearing a cap and a headphone device in the image.

The recognition data is any data extracted from the image recognition. For example, the recognition data includes: data describing the audio reproduction device 504 (e.g., a shape, a brand, a model, a type and/or a color of the audio reproduction device 504); a color of the user's clothes; a color of the user's hair; and one or more deteriorating factors, etc. A deteriorating factor is a factor that may deteriorate a sound quality of an audio reproduction device 504. Examples of a deteriorating factor include, but are not limited to: long hair; wearing a beanie or a cap while wearing an audio reproduction device 504 over the head; wearing a pair of glasses; wearing a wig; and wearing a mask, etc. In one embodiment, the image recognition module 1805 sends the recognition data to the filter module 811 and/or the aggregation module 515. In another embodiment, the image recognition module 1805 stores the recognition data in the second storage 516.

In the illustrated embodiment, the filter module 811 is communicatively coupled to the bus 1820 via signal line 1828. The filter module 811 performs equalization on an audio signal before the audio signal is sent to an audio reproduction device 504 for playback. An equalization process is a process to adjust signal strength at certain frequencies within a signal. In some implementations, the filter module 811 filters an audio signal by applying a pre-programmed equalization to the audio signal. In one embodiment, a pre-programmed equalization is configured for a specific genre of music. For example, if the audio signal is related to rock music, the filter module 811 filters the audio signal using a pre-programmed equalizer customized for rock music. An equalizer is a filter that implements an equalization process. In another embodiment, a pre-programmed equalization is configured to boost sound quality at certain frequencies. For example, a pre-programmed equalization applies a bass booster to an audio signal to improve sound quality in the bass.

In one embodiment, the filter module 811 receives recognition data from the image recognition module 1805. The filter module 811 determines one or more deteriorating factors from the recognition data. For example, the filter module 811 determines one or more of the following: the user has long hair; the user is wearing a beanie or a cap; the user is wearing a pair of glasses; and/or the user is wearing a wig, etc. The filter module 811 estimates a sound degradation such as an amount of sound loss in the audio reproduction device 504 that is caused by the one or more deteriorating factors. For example, assume a user is wearing a beanie and an audio reproduction device 504 over the beanie. The filter module 811 determines a sound leakage from the cups 602 of the audio reproduction device 504 that is caused by the beanie. The filter module 811 applies a digital filter or an equalizer to the audio signal for compensating the sound degradation such as the sound loss caused by the one or more deteriorating factors.

In some implementations, the filter module 811 filters the audio signal using different equalizers to compensate the sound degradation caused by different deteriorating factors. For example, if long hair is the only deteriorating factor, the filter module 811 may filter the audio signal using a first equalizer to compensate for sound loss caused by the long hair. If the deteriorating factor is wearing a cap, the filter module 811 may filter the audio signal using a second equalizer to compensate for the sound loss caused by the wearing of the cap. If the deteriorating factors include long hair and wearing of a cap, the filter module 811 may filter the audio signal using a third equalizer to compensate for the sound loss caused by the long hair and the wearing of the cap. In some other implementations, the filter module 811 filters the audio signal using the same equalizer to compensate for the sound degradation caused by various deteriorating factors.

In another embodiment, the filter module 811 retrieves target sound signature data 839 configured for an audio reproduction device 504 from the second storage 516. The filter module 811 creates a digital filter to emulate a target sound signature or a sound signature within a target sound range. For example, the filter module 811 filters an audio signal using an equalizer and outputs the filtered audio signal whose corresponding sound wave reproduced by the audio reproduction device 504 matches either the target sound signature or a sound signature within the target sound range. The filter module 811 is also described above with reference to FIG. 8, and the description will not be repeated here.

In the illustrated embodiment, the second storage 516 stores target sound signature data 839, instruction data 1841 and second GUI data 1843. The target sound signature data 839 is described above and the description will not be repeated here. The instruction data 1841 is data describing one or more instructions for tuning an audio reproduction device 504. Example instructions are described above and the description will not be repeated here. The second GUI data 1843 is graphical data for providing a user interface to a user. In one embodiment, the user interface depicts one or more instructions for a user. In another embodiment, the user interface depicts an equalization process and/or one or more equalization options. In yet another embodiment, the user interface depicts one or more items recommended to a user such as new headphones, speaker docks, music, etc. In still yet another embodiment, the user interface depicts recognition data extracted from image recognition. Example user interfaces are illustrated in FIGS. 26A and 26B.

The aggregation module 515 is code and routines that, when executed by the processor 508, aggregates data associated with a user. In one embodiment, the data associated with a user includes one or more of recognition data extracted from the image recognition, music data describing a piece of music that the user listens to (e.g., a title of a song, a music genre, an artist, an album, etc.), interest data describing the user's interest (e.g., ski, snowboarding, biking, hiking, etc.), social data describing a social activity performed by the user in a social network (e.g., making comments on a new woofer, posting pictures of the user's home theater speaker system, endorsing one or more headsets, writing music review in a blog, etc.), preference data describing one or more user preferences (e.g., the user's favorite color, the user's most disliked color, the user's favorite music, the user's favorite band, etc.), profile data describing a user profile (e.g., calendar events, appointments, etc.) and device usage data describing one or more audio reproduction devices 504 used or purchased by the user.

In one embodiment, a first user is connected to a second user in a social graph and the data associated with the first user optionally includes music data describing a piece of music that the second user listens to, device usage data describing one or more audio reproduction devices 504 used or purchased by the second user and social data describing a social activity performed by the second user in a social network. For example, the data associated with the first user includes a friend's favorite music and the friend's endorsement on a headset upon the friend's consent.

In one embodiment, a user provides various types of data (e.g., interest data, profile data, preference data, etc.) to the aggregation module 515. For example, the aggregation module 515 receives, via the intake module 201, answer data corresponding to a questionnaire from a user. In another embodiment, the aggregation module 515 retrieves the data associated with the user from a server (e.g., a social network server 124, a user profile server (not pictured) that stores a user profile for the user, an online music provider, etc.). The aggregation module 515 aggregates the data associated with the user. For example, the aggregation module 515 aggregates various types of data such as the answer data, the music data, the recognition data, the interest data, the social data, the preference data and the device usage data to generate the aggregated data. The aggregation module 515 sends the aggregated data to the recommendation module 535. In one embodiment, the aggregation module 515 stores the aggregated data in the second storage 516.

The evaluation module 525 is code and routines that, when executed by the processor 508, evaluates an audio reproduction device 504. In one embodiment, the evaluation module 525 measures a frequency response for an audio reproduction device 504 in two or more frequency bands such as a low band, a mid band and/or a high band. A low band is a frequency band with a frequency range between 30 Hz and 150 Hz. A mid band is a frequency band with a frequency range between 150 Hz and 500 Hz. A high band is a frequency band with a frequency range between 500 Hz and 10 KHz.

A one-third octave band is referred to as a ⅓ octave band herein. A ⅓ octave band is a frequency band satisfying that a ratio between the upper band limit frequency (represented as $f_{upper}$) and the lower band limit frequency (represented as $f_{lower}$) equals to the cube root of 2. In other words, a ⅓ octave band is a frequency band satisfying $$f_{upper} = \sqrt[3]{2}\, f_{lower}.$$

Each ⅓ octave band has a center frequency (represented as $f_{ctr}$), with $$f_{upper} = \sqrt[6]{2}\, f_{ctr} \text{ and } f_{lower} = \frac{f_{ctr}}{\sqrt[6]{2}}.$$

Figure 27:
FIG. 27 is a graphical representation illustrating example one-third octave bands according to one embodiment.

Example ⅓ octave bands are illustrated in FIG. 27.

Figure 25A:
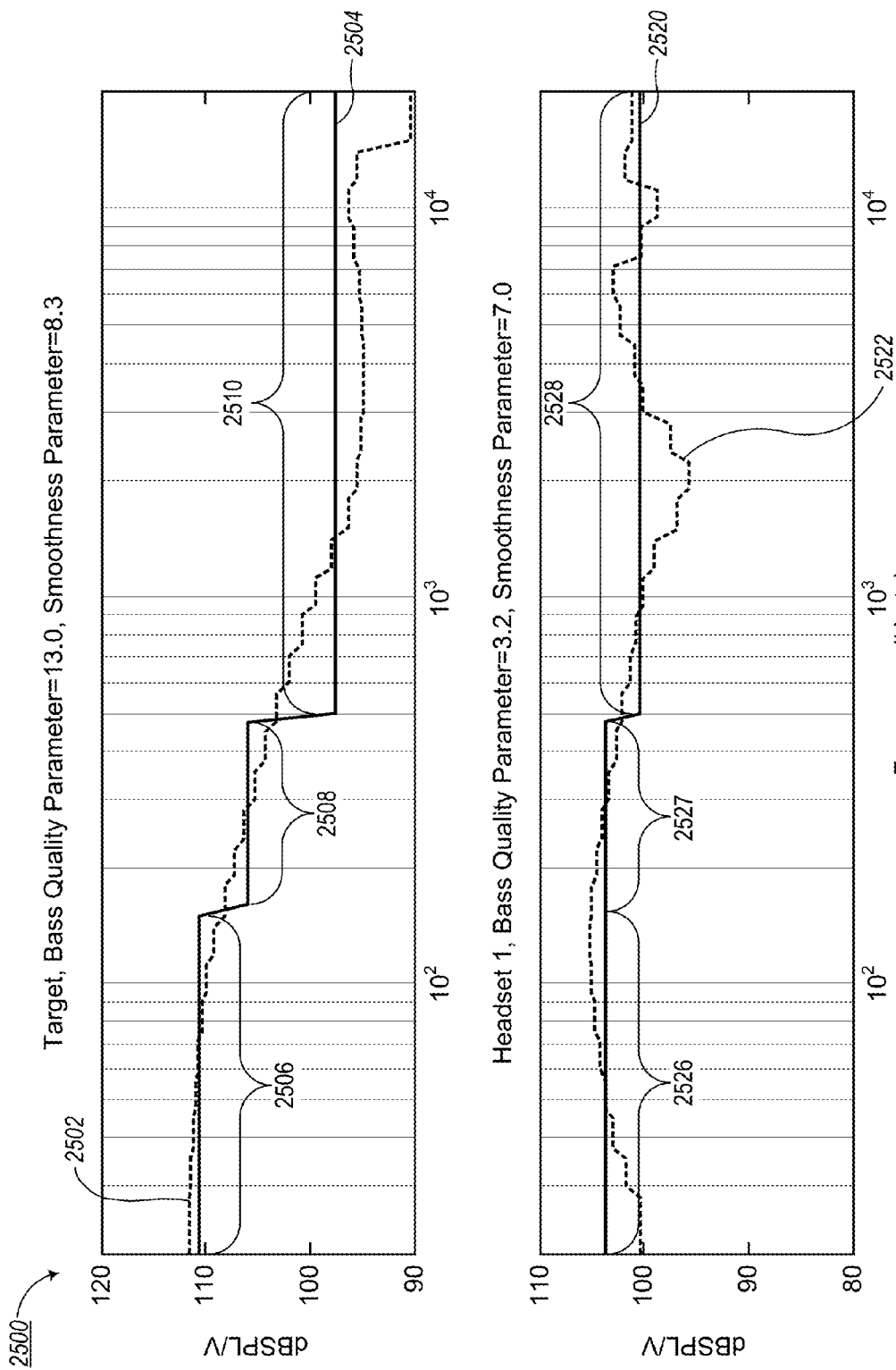
FIGS. 25A and 25B are graphical representations illustrating one-third octave band energy levels and average energy levels for various audio reproduction devices according to one embodiment.
Figure 25B:
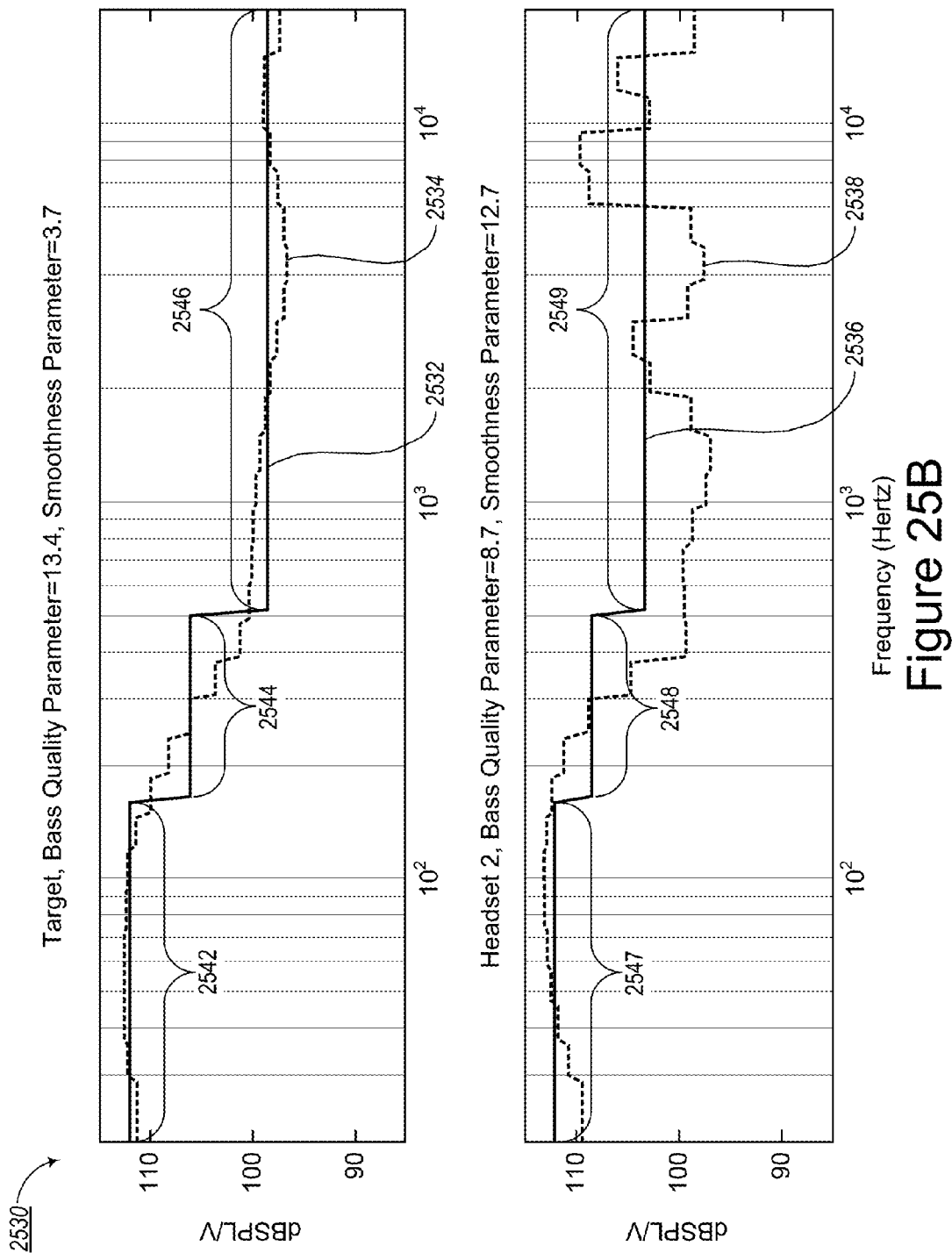

In one embodiment, an energy level for an audio signal (or, an energy level of a corresponding sound wave generated from the audio signal) is measured using a sound pressure level. For example, a higher value for a sound pressure level at a particular frequency indicates a higher energy level at the particular frequency. Examples of energy levels are illustrated in FIGS. 25A and 25B. In one embodiment, the evaluation module 525 determines all the ⅓ octave bands within each of the two or more frequency bands such as the low band, the mid band and/or the high band. The evaluation module 525 determines an energy level for each ⅓ octave band. For example, the evaluation module 525 determines an energy level for each ⅓ octave band as an average sound pressure level within the ⅓ octave band. In another example, the evaluation module 525 determines an energy level for each ⅓ octave band as a value of the sound pressure level at a center frequency of the ⅓ octave band.

Figure 25C:
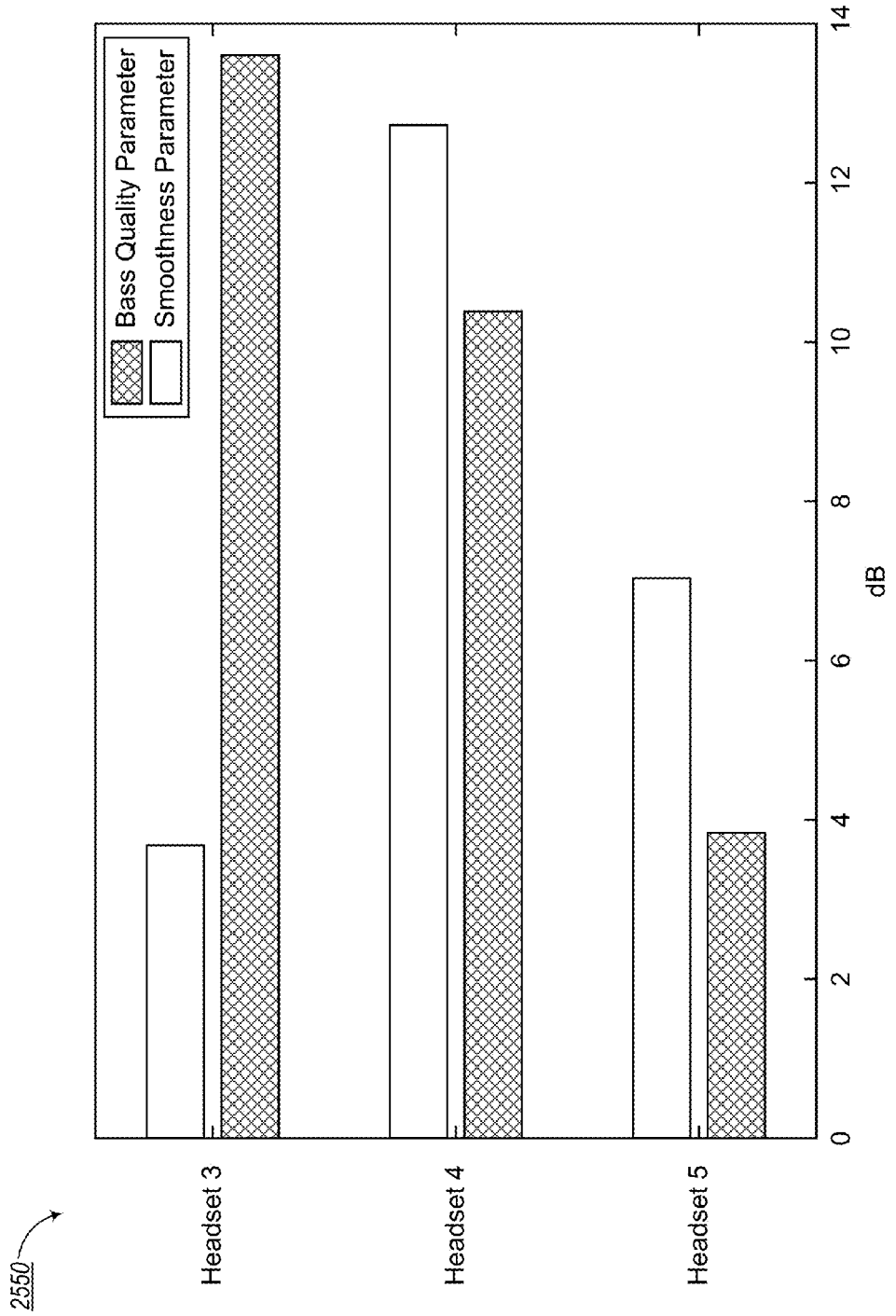
FIG. 25C is a graphical representation illustrating a bass quality parameter and a smoothness parameter for various audio reproduction devices according to one embodiment.

A smoothness parameter is data indicating a smoothness of a sound reproduced by an audio reproduction device 504. For example, a smaller value for the smoothness parameter indicates that the corresponding audio reproduction device 504 reproduces a smoother or less fluctuated sound than that reproduced by another audio reproduction device 504 having a higher value for the smoothness parameter. Example smoothness parameters are illustrated in FIGS. 25A-25C. In one embodiment, the value of the smoothness parameter has a unit of Decibel (dB).

In one embodiment, the evaluation module 525 determines a smoothness parameter for the audio reproduction device 504 based on energy levels of the ⅓ octave bands. For example, the evaluation module 525 determines a maximal energy level and a minimal energy level of all the ⅓ octave bands within the high band, and a value for the smoothness parameter as the difference between the maximal energy level and the minimal energy level. In another embodiment, the evaluation module 525 determines energy levels for one-$N^{th}$ (1/N) octave bands, where N represents an integer greater than 3 (e.g., N=4, 5, 6 . . . ). The 1/N octave bands with N greater than 3 have a higher resolution than the ⅓ octave bands. The evaluation module 525 determines a smoothness parameter based on the energy levels of the 1/N octave bands. For example, the evaluation module 525 determines all the 1/N octave bands within the high band, and a value for the smoothness parameter as the difference between the maximal energy level and the minimal energy level of all the 1/N octave bands within the high band.

In one embodiment, the evaluation module 525 determines an average energy level for each of the two or more frequency bands (e.g., the low band, the mid band and/or the high band). For example, the evaluation module 525 determines an average energy level for each frequency band as an average sound pressure level within the specific frequency band. The evaluation module 525 determines a bass quality parameter for the audio reproduction device 504 based on the average energy levels at different frequency bands. For example, the evaluation module 525 determines a bass quality parameter as the difference between the average energy level in the low band and the average energy level in the high band.

A bass quality parameter is data indicating bass quality of a sound reproduced by an audio reproduction device 504. For example, a smaller value for the bass quality parameter indicates the corresponding audio reproduction device 504 reproduces a more balanced bass sound than that reproduced by another audio reproduction device 504 having a greater value for the bass quality parameter. The bass quality parameter indicates a tonal balance. For example, a bass quality parameter indicates a balance between the low band (bass) and the high band. In one embodiment, the value of the bass quality parameter has a unit of Decibel (dB).

The application of the smoothness parameter and/or the bass quality parameter is advantageous in numerous respects. First, the smoothness parameter and/or the bass quality parameter can be used to define a target sound signature. Second, the parameters can be used in the equalization of the audio reproduction device 504. In some implementations, the filter module 811 receives the smoothness parameter and/or the bass quality parameter associated with an audio reproduction device 504 from the evaluation module 525, and applies an equalizer to filter an audio signal based on the smoothness parameter and/or the bass quality parameter. For example, if the smoothness parameter is above a first threshold indicating that a sound fluctuation in the sound wave reproduced by the audio reproduction device 504 is above a pre-determined level, the filter module 811 applies a digital filter to smooth out the high-frequency fluctuation in the audio signal. In another example, if the bass quality parameter is above a second threshold indicating an imbalance between the low band and the high band, the filter module 811 applies a digital filter to boost signal strength in certain frequencies.

Third, the parameters can be used to characterize and rate various types of audio reproduction devices 504 with simple metrics instead of complex frequency responses, which facilitates a user's understanding of the performance of the audio reproduction devices 504. The parameters can be printed on a package box of an audio reproduction device 504 or presented on a web page linked to the audio reproduction device 504 to facilitate a user's selection of the audio reproduction device 504. For example, if a user likes headphones with a smooth sound, the user can select headphones having a smaller smoothness parameter. In another example, if a user likes speakers with a better tonal balance, the user can select a speaker having a smaller bass quality parameter.

The recommendation module 535 is code and routines that, when executed by the processor 508, provides recommendation to a user. In one embodiment, the recommendation module 535 receives aggregated data associated with a user from the aggregation module 515 and provides one or more recommended items to the user based on the aggregated data. For example, if the aggregated data indicates that a user wears a blue shirt and uses a first headset as shown in an image, the recommendation module 535 recommends a new blue headset to the user which is an upgrade of the first headset. In another example, if the aggregated data indicates that a user likes hiking and rock music, the recommendation module 535 recommends a headset specialized for outdoor activities and rock music to the user. In yet another example, if the aggregated data indicates that a user's friend has purchased a jazz album and a speaker system featured for jazz music, the recommendation module 535 recommends the speaker system and the jazz album to the user. In still yet another example, if the aggregated data indicates that a user plans to travel oversea next month, the recommendation module 535 recommends a headset customized for airplane noise cancellation to the user.

Example recommended items for a user include, but are not limited to, an upgrade of an audio reproduction device 504 used by the user, an audio reproduction device 504 having a customized feature for the user (e.g., headphones with a customized color, a customized sound feature, a customized shape or two customized cups, etc.), a new type of audio reproduction devices 504, a discount for an audio reproduction device 504, a deal for purchasing music, recommended music (e.g., best rock of this year, new albums, etc.) and/or one or more matching products received from the product matching module 114.

In one embodiment, the recommendation module 535 sends the recommended items to the second GUI module 514, causing the second GUI module 514 to generate graphical data for providing a user interface. The user interface depicts the recommended items. Example user interfaces are illustrated in FIGS. 26A, 26B and 26F.

Figure 19:
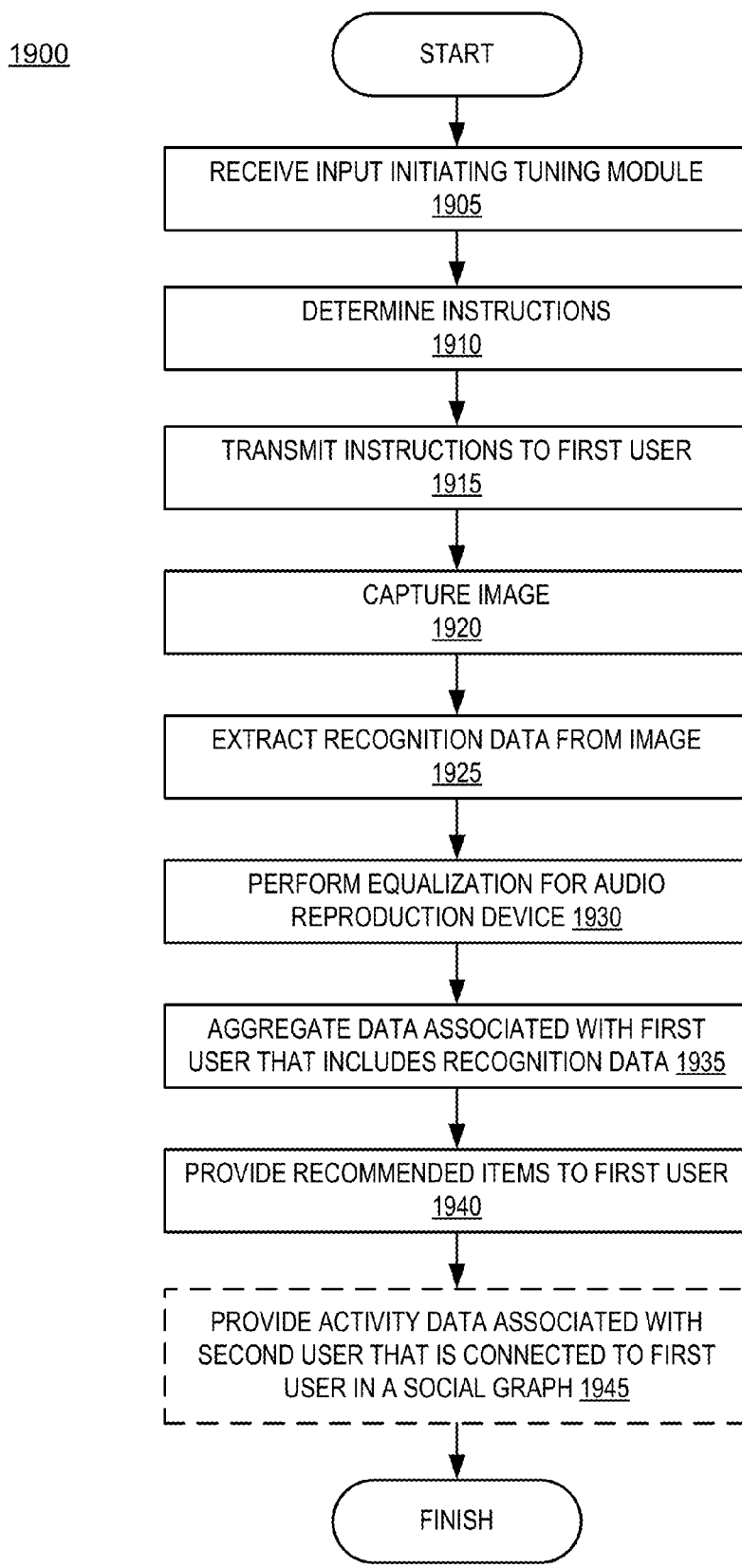
FIG. 19 is a flowchart illustrating a method for interacting with an audio reproduction device and a user that uses the audio reproduction device according to one embodiment.

FIG. 19 is a flowchart illustrating a method 1900 for interacting with an audio reproduction device 504 and a first user that uses the audio reproduction device 504 according to one embodiment. In the illustrated embodiment, the instruction module 1801 receives 1905 an input initiating the tuning module 512. The instruction module 1801 determines 1910 one or more instructions for the first user. The instruction module 1801 transmits 1915 the one or more instructions to the first user. The image capture module 1803 captures 1920 an image of the first user that uses an audio reproduction device 504. The image recognition module 1805 extracts 1925 recognition data from the image. The filter module 811 performs 1930 equalization for the audio reproduction device 504 based on the recognition data. The aggregation module 515 aggregates 1935 data associated with the first user that includes the recognition data. The recommendation module 535 provides 1940 recommended items to the first user. Optionally, the recommendation module 535 provides 1945 activity data associated with a second user that is connected to the first user in a social graph. For example, the recommendation module 535 provides a list of a friend's favorite music and favorite headphones to the first user.

Figure 20:
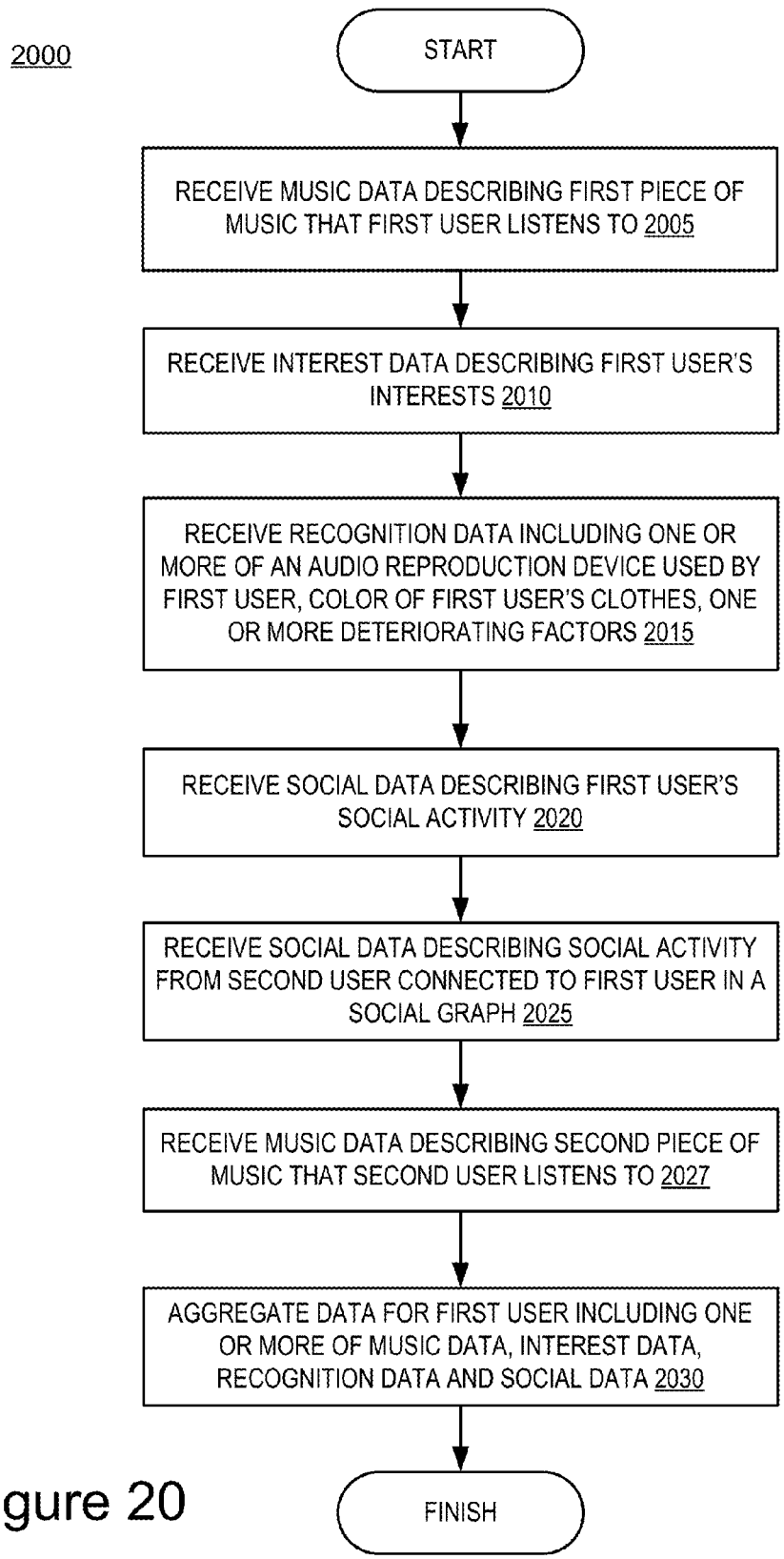
FIG. 20 is a flowchart illustrating a method for aggregating data associated with a user according to one embodiment.

FIG. 20 is a flowchart illustrating a method 2000 for aggregating data associated with a first user according to one embodiment. In the illustrated embodiment, the aggregation module 515 receives 2005 music data describing a first piece of music that the first user listens to from a second client 506. The aggregation module 515 receives 2010 interest data describing the first user's interests from a user profile server (not pictured) or a social network server 124. The aggregation module 515 receives 2015 recognition data from the image recognition module 1805 that includes one or more of an audio reproduction device 504 used by the first user, a color of the first user's clothes and one or more deteriorating factors. The aggregation module 515 receives 2020 social data describing one or more social activities performed by the first user in a social network from the social network server 124. The aggregation module 515 receives 2025, from the social network server 124, social data describing one or more social activities performed by a second user that is connected to the first user in a social graph. The aggregation module 515 receives 2027 music data describing a second piece of music that the second user listens to. The aggregation module 515 aggregates 2030 data for the first user that includes one or more of the music data, the interest data, the recognition data and the social data.

FIG. 21 is a graphical representation 2100 illustrating a target sound signature 2104 and a target sound range according to another embodiment. FIG. 21 is described above and the description will not be repeated here.

Figure 22:
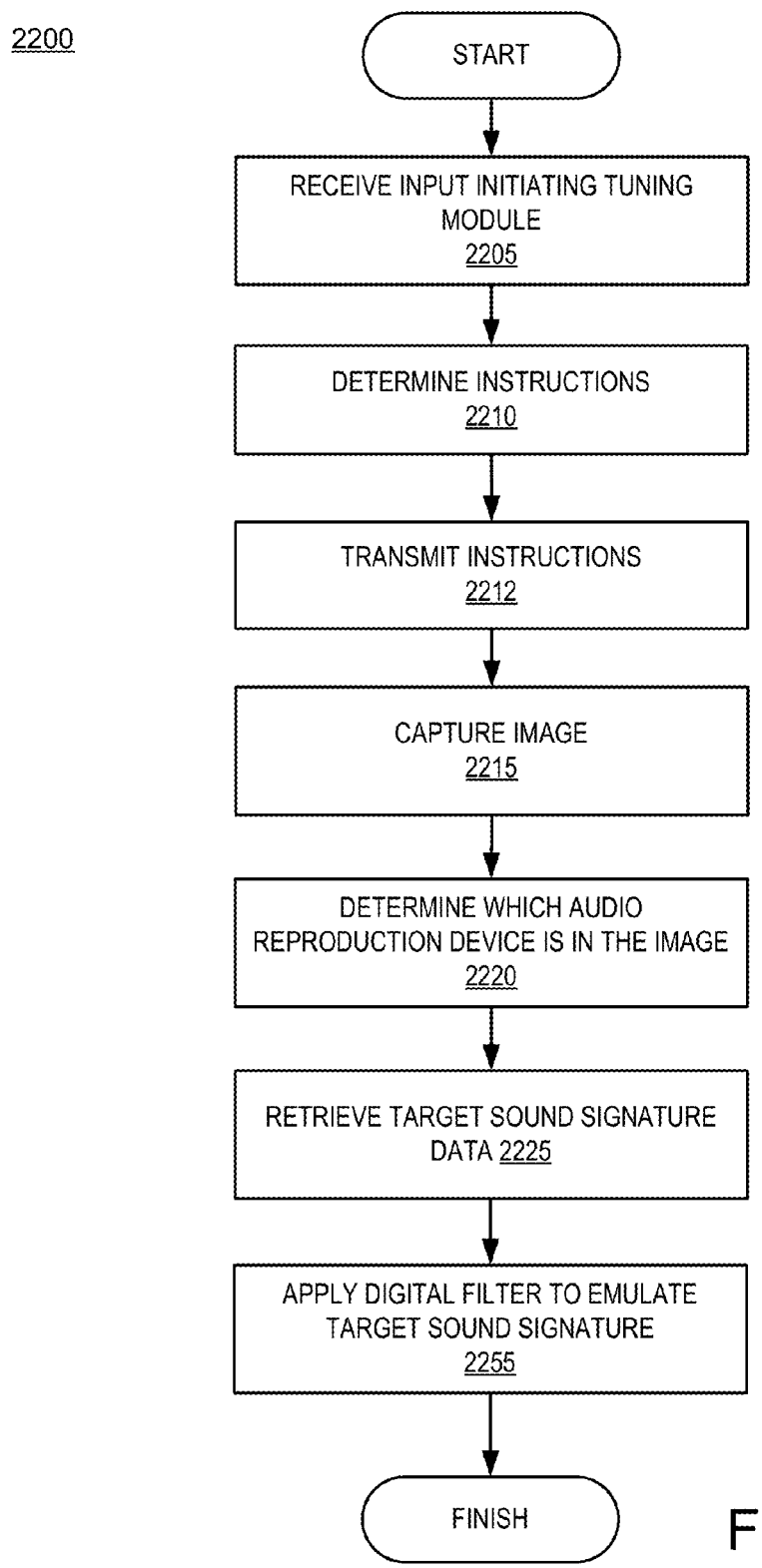
FIG. 22 is a flowchart illustrating a method for tuning an audio reproduction device according to another embodiment.

FIG. 22 is a flowchart illustrating a method 2200 for tuning an audio reproduction device 504 according to another embodiment. In the illustrated embodiment, the instruction module 1801 receives 2205 an input initiating the tuning module 512. The instruction module 1801 determines 2210 one or more instructions for a user. The instruction module 1801 transmits 2212 the one or more instructions to the user. The image capture module 1803 captures 2215 an image of the user that uses the audio reproduction device 504. The image recognition module 1805 determines 2220 which audio reproduction device 504 is in the image. The filter module 811 retrieves 2225 target sound signature data for the determined audio reproduction device 504 from the second storage 516. The filter module 811 applies 2255 a digital filter to emulate the target sound signature or a sound signature within a target sound range.

Figure 23:
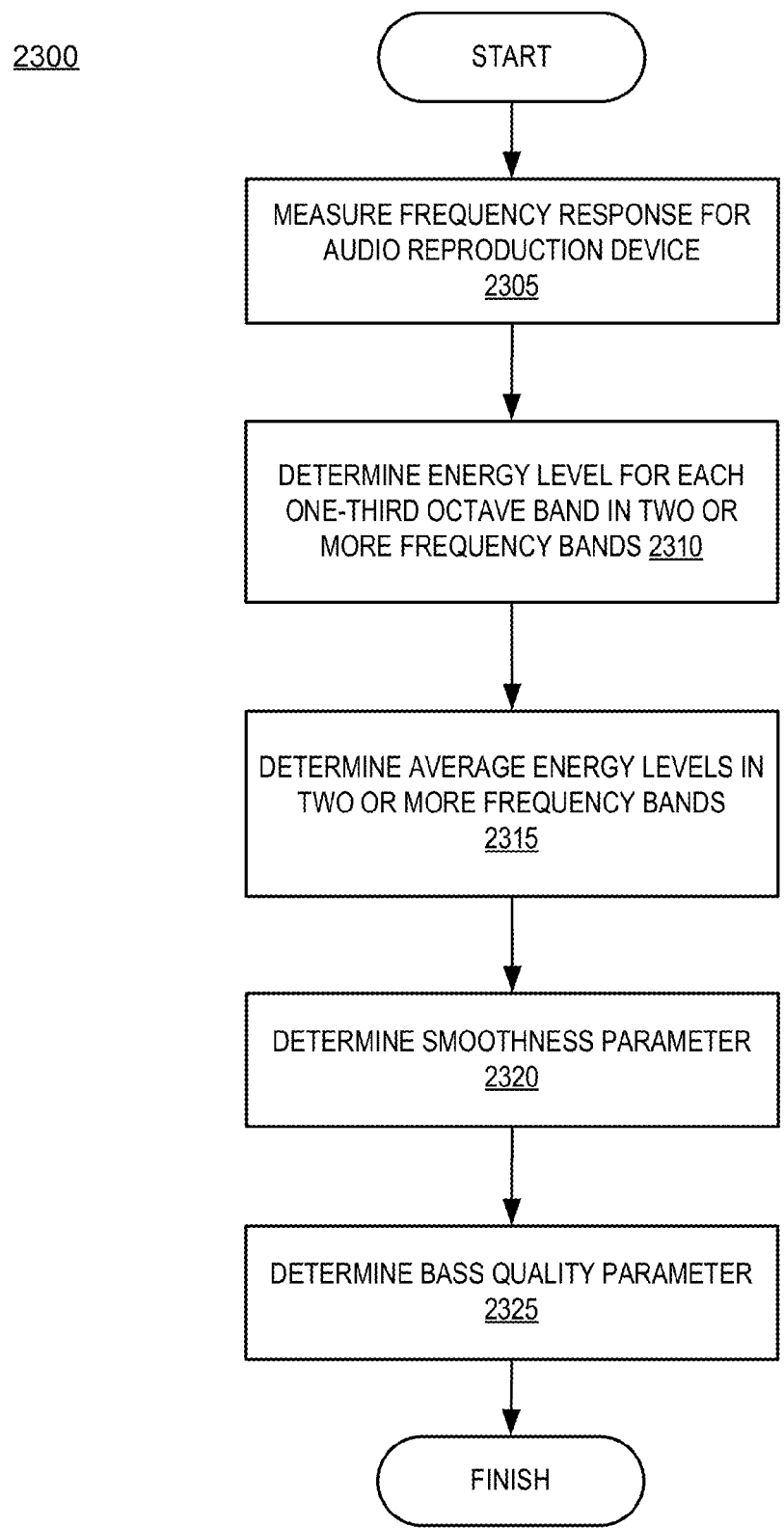
FIG. 23 is a flowchart illustrating a method for evaluating an audio reproduction device according to one embodiment.

FIG. 23 is a flowchart illustrating a method 2300 for evaluating an audio reproduction device 504 according to one embodiment. The evaluation module 525 measures 2305 a frequency response for the audio reproduction device 504. The evaluation module 525 determines 2310 an energy level for each ⅓ octave band within two or more frequency bands including a low band, a mid band and/or a high band The evaluation module 525 determines 2315 average energy levels in the two or more frequency bands respectively. The evaluation module 525 determines 2320 a smoothness parameter for the audio reproduction device 504 based on the energy levels of the ⅓ octave bands. The evaluation module 525 determines 2325 a bass quality parameter based on the average energy levels of the two or more frequency bands.

Figure 24:
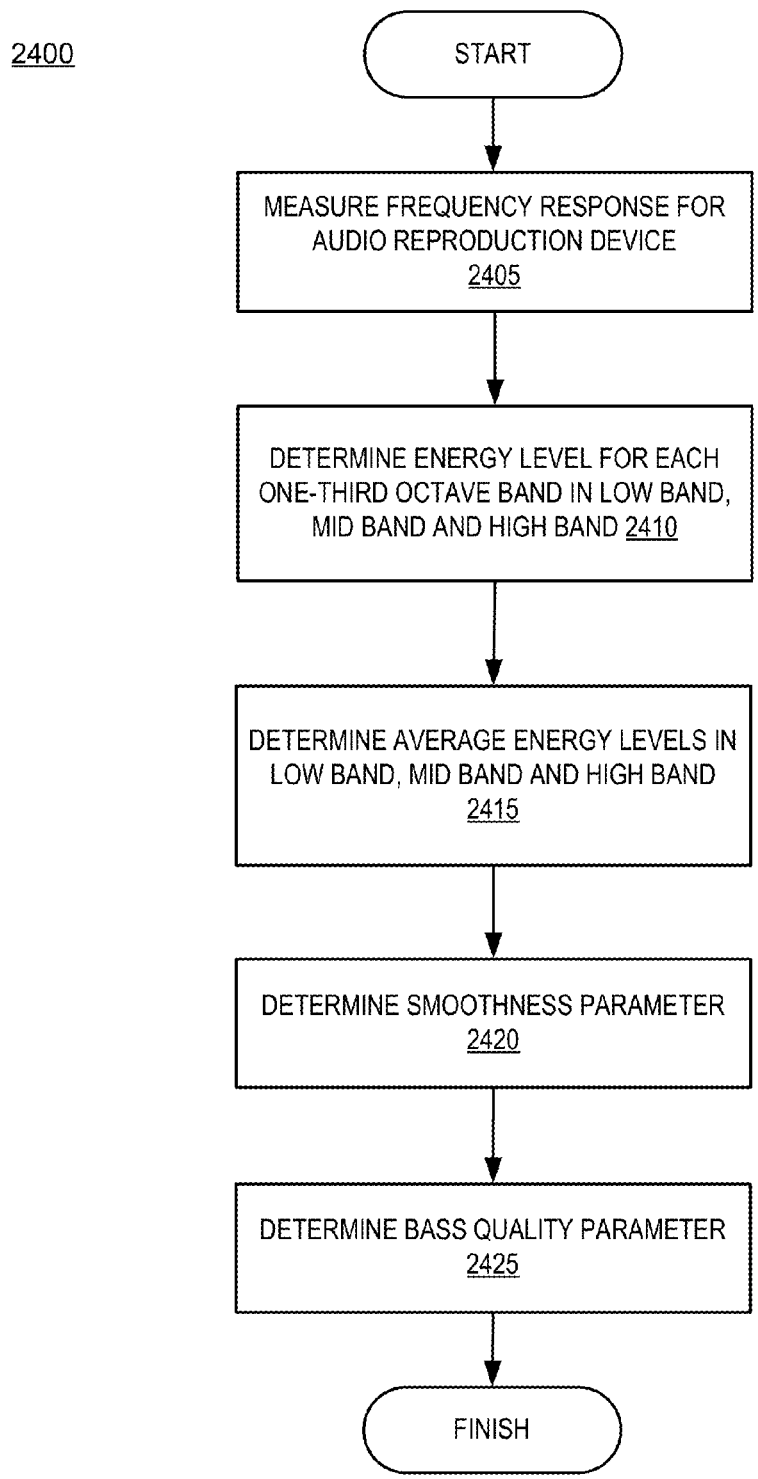
FIG. 24 is a flowchart illustrating a method for evaluating an audio reproduction device according to another embodiment.

FIG. 24 is a flowchart illustrating a method 2400 for evaluating an audio reproduction device 504 according to another embodiment. The evaluation module 525 measures 2405 a frequency response for the audio reproduction device 504. The evaluation module 525 determines 2410 an energy level for each ⅓ octave band within a low band, a mid band and/or a high band, respectively. The evaluation module 525 determines 2415 average energy levels in the low band, the mid band and the high band, respectively. The evaluation module 525 determines 2420 a smoothness parameter for the audio reproduction device 504 based on the energy levels of the ⅓ octave bands in the high band. The evaluation module 525 determines 2425 a bass quality parameter based on the average energy levels of the low band and the high band.

FIGS. 25A and 25B are graphical representations 2500, 2530 illustrating one-third octave band energy levels and average energy levels at different frequency bands for various audio reproduction devices 504 according to one embodiment. In FIGS. 25A and 25B, the unit "dBSPL/V" represents a sound pressure level in Decibel per voltage. Referring to FIG. 25A, a curve 2502 depicted in a dashed line represents ⅓ octave band energy levels for a target sound signature. The target sound signature is associated with a bass quality parameter having a value of 13.0 dB and a smoothness parameter having a value of 8.3 dB. A curve 2504 depicted in a solid line represents average energy levels in a low band 2506, a mid band 2508 and a high band 2510 for the target sound signature, respectively. A curve 2522 depicted in a dashed line represents ⅓ octave band energy levels for Headset 1. Headset 1 is associated with a bass quality parameter having a value of 3.2 dB and a smoothness parameter having a value of 7.0 dB. A curve 2520 depicted in a solid line represents average energy levels in a low band 2526, a mid band 2527 and a high band 2528 for Headset 1, respectively.

Referring to FIG. 25B, a curve 2534 depicted in a dashed line represents ⅓ octave band energy levels for another target sound signature. The target sound signature is associated with a bass quality parameter having a value of 13.4 dB and a smoothness parameter having a value of 3.7 dB. A curve 2532 depicted in a solid line represents average energy levels in a low band 2542, a mid band 2544 and a high band 2546 for the target sound signature, respectively. A curve 2538 depicted in a dashed line represents ⅓ octave band energy levels for Headset 2. Headset 2 is associated with a bass quality parameter having a value of 8.7 dB and a smoothness parameter having a value of 12.7 dB. A curve 2536 depicted in a solid line represents average energy levels in a low band 2547, a mid band 2548 and a high band 2549 for Headset 2, respectively.

FIG. 25C is a graphical representation 2550 illustrating a bass quality parameter and a smoothness parameter for various audio reproduction devices 504 according to one embodiment. In the illustrated embodiment, Headset 3 is associated with the smallest smoothness parameter, indicating that Headset 3 has the lowest fluctuations or highest smoothness in sound quality. Headset 5 is associated with the smallest bass quality parameter, indicating Headset 5 has the best tonal balance between the low band and the high band.

FIG. 26A is a graphical representation 2600 illustrating a user interface for providing recommendation 2602 to a user according to one embodiment. In the illustrated embodiment, the recommended items include an audio reproduction device 504 (e.g., Headset 6) and multiple pieces of music (e.g., most popular rock music). The example user interface also provides a friend's comment 2608 on Headset 6 to the user.

FIG. 26B is a graphical representation 2610 illustrating a user interface for interacting with a user that uses an audio reproduction device 504 according to one embodiment. The example user interface includes an image 2618 captured for the user. The image 2618 indicates that the user has long hair and wears a first generation blue Super Headset A. The example user interface also includes an image recognition section 2612, an equalization section 2614 and a recommendation section 2616. The image recognition section 2612 provides recognition data extracted from the image 2618 to the user. The equalization section 2614 provides various equalization options to the user. For example, a first equalization option is to apply an equalizer featured for rock since the recognition data indicates the user listens to rock music. A second equalization option is to apply an equalizer featured for compensating sound degradation caused by long hair since the recognition data indicates that the user has long hair. A third equalization option is to apply an equalizer to emulate a target sound signature. The recommendation section 2616 recommends a new headset to the user which is a second generation black Super Headset A, since the recognition data indicates that the user wears a black jacket and a first generation Super Headset A.

FIG. 26C is a graphical representation 2620 illustrating a user interface for capturing an image according to one embodiment. The example user interface includes a captured image 2622, recognition data 2624 extracted from the captured image and one or more instructions 2626 to capture the image 2622.

Figure 26D:
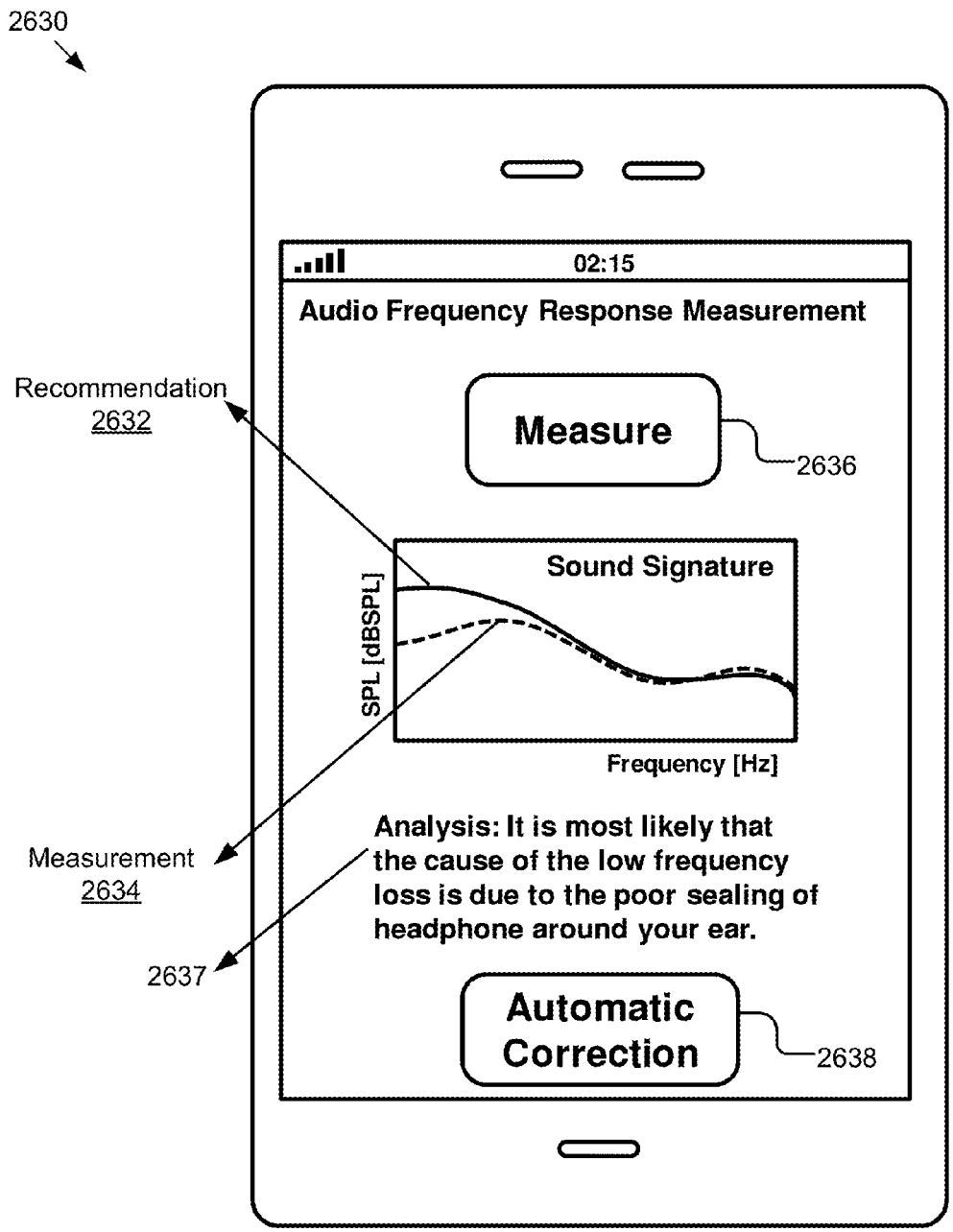
FIG. 26D is a graphical representation illustrating a user interface for tuning an audio reproduction device according to one embodiment.

FIG. 26D is a graphical representation 2630 illustrating a user interface for tuning an audio reproduction device 504 according to one embodiment. If a user selects a "measure" button 2636, a frequency response of the audio reproduction device 504 is measured. A sound pressure level from the measurement 2634 is depicted using a dashed line and a sound pressure level recommendation 2632 is depicted using a solid line. The sound pressure level recommendation 2632 represents a sound signature recommended for the audio reproduction device 504. In one embodiment, the recommendation 2632 is a target sound signature. In another embodiment, the recommendation 2632 is a sound signature within a target sound range. The example user interface also provides an analysis 2637 for the difference between the measurement 2634 and the recommendation 2632. If the user selects an "automatic correction" button 2638, the filter module 811 automatically determines a digital filter to correct the sound degradation in the audio reproduction device 504. For example, the filter module 811 automatically filters audio signals using a digital filter so that a new measurement 2634 from the filtered audio signals matches the recommendation 2632.

Figure 26E:
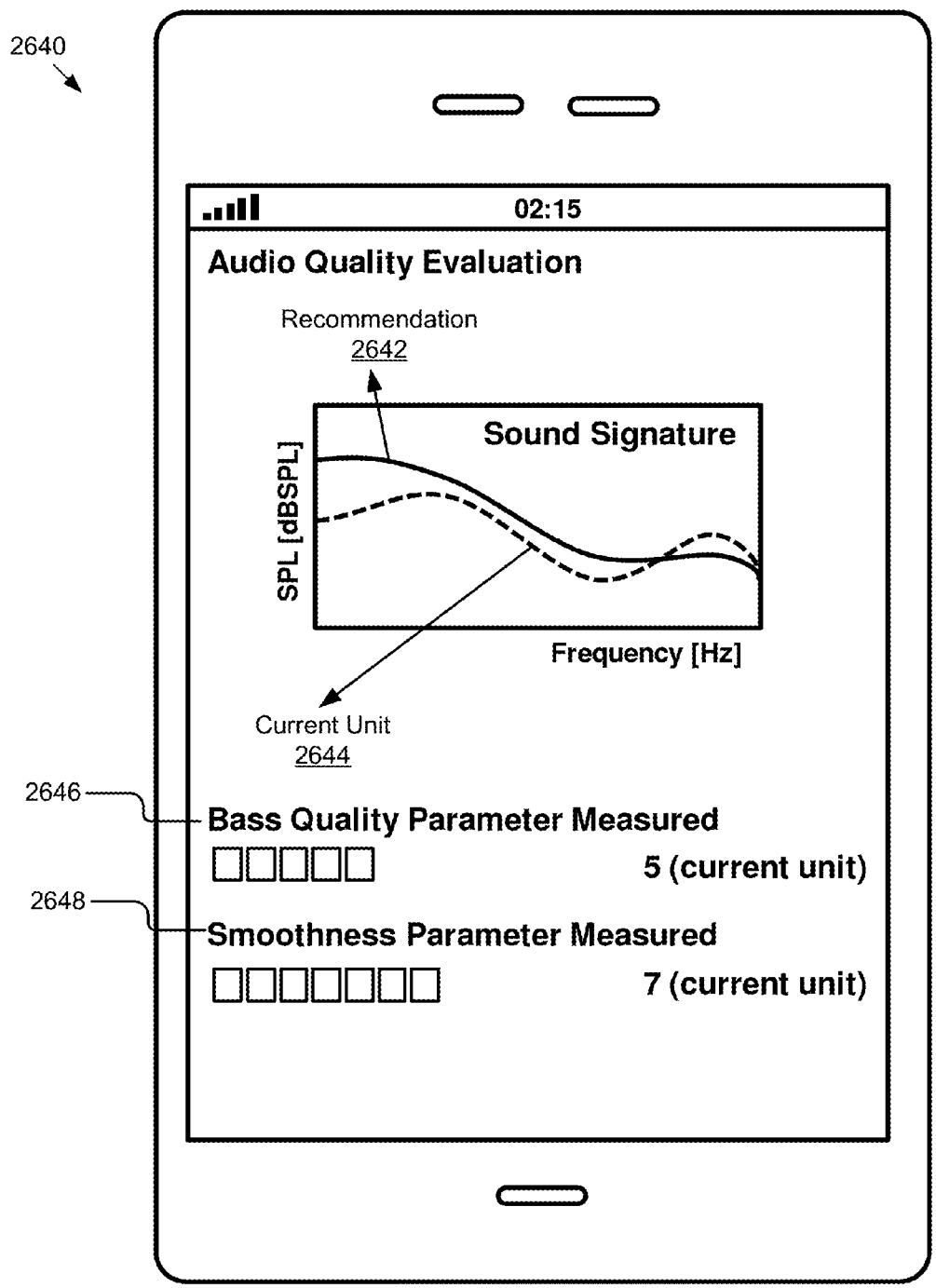
FIG. 26E is a graphical representation illustrating a user interface for audio quality evaluation according to one embodiment.
Figure 26F:
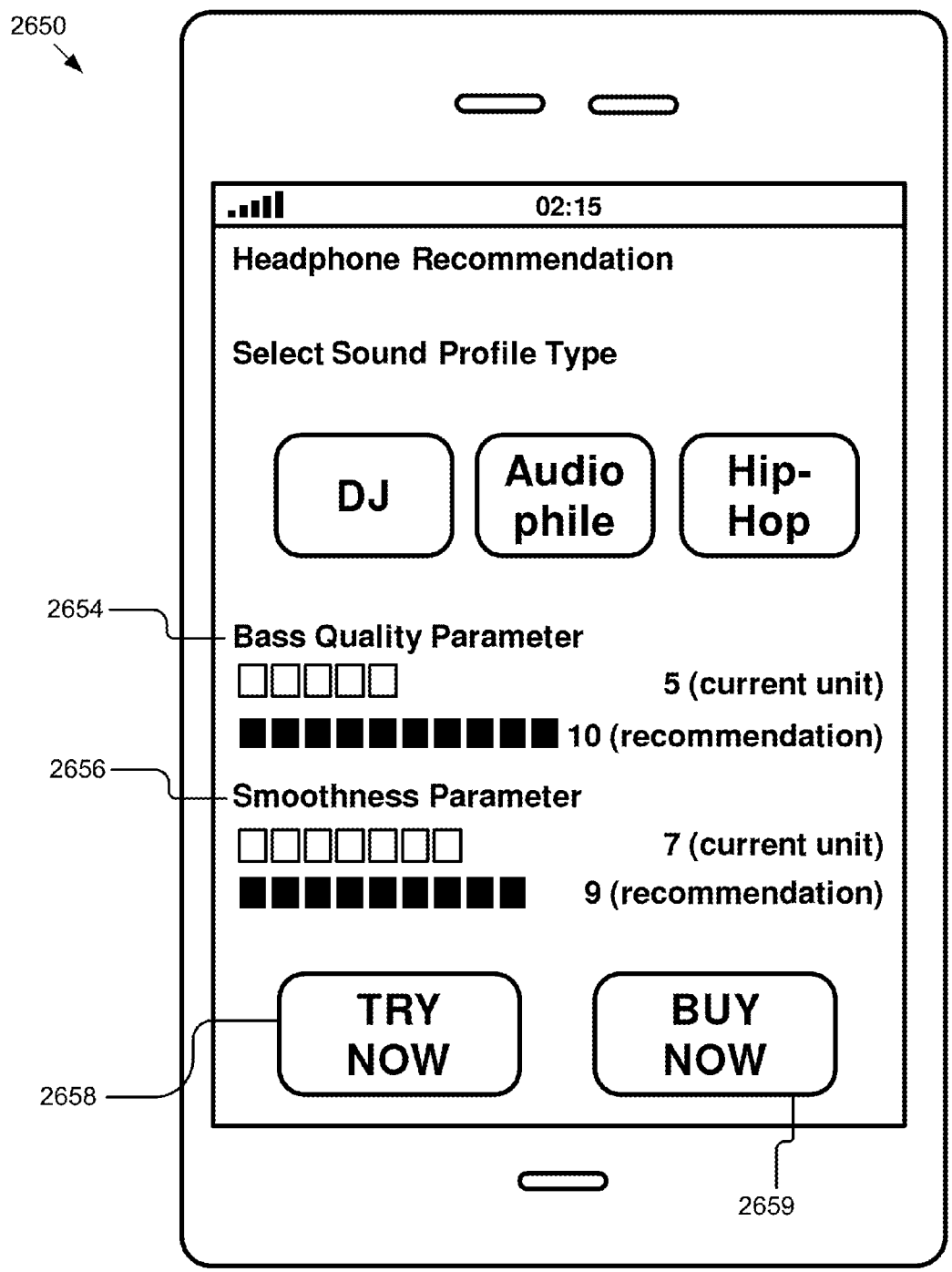
FIG. 26F is a graphical representation illustrating a user interface that recommends an audio reproduction device to a user according to one embodiment.

FIG. 26E is a graphical representation 2640 illustrating a user interface for audio quality evaluation according to one embodiment. The example user interface includes a sound pressure level recommendation 2642 depicted in a solid line and a sound pressure level of a current unit 2644 (e.g., a current headset to be evaluated) depicted in a dashed line. The example user interface depicts a bass quality parameter 2646 and a smoothness parameter 2648 for the current unit.

FIG. 26F is a graphical representation 2650 illustrating a user interface that recommends headphones to a user according to one embodiment. In the example user interface, a user can select a sound profile type to be applied in the headphones. The sound profile type is applied to audio signals using an equalizer. The example user interface depicts a first value for a bass quality parameter 2654 measured from a current unit (e.g., the current headphones) and a recommendation value for the bass quality parameter 2654 retrieved from the second storage 516. The example user interface depicts a first value for a smoothness parameter 2656 measured from the current unit and a recommendation value for the smoothness parameter 2656 retrieved from the second storage 516. If the user already selects a sound profile type, the user can select a "try now" button 2658 to listen to a sound generated by the headphones when the sound profile type is applied. The user can select a "buy now" button 2659 to purchase the headphones.

FIG. 27 is a graphical representation 2700 illustrating example ⅓ octave bands according to one embodiment. The illustrated graphical representation 2700 includes a first column listing a lower band limit, a second column listing a center frequency and a third column listing an upper band limit for each ⅓ octave band.

In the foregoing description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories (CD-ROMs), magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
capturing an image depicting a first audio reproduction device used by a first user;
performing image recognition on the captured image to extract recognition data from the image, the recognition data including data describing the first audio reproduction device and one or more deteriorating factors that deteriorate a sound quality in the first audio reproduction device;
estimating a sound degradation in the first audio reproduction device that is caused by the one or more deteriorating factors;
applying a first digital filter to compensate the sound degradation in the first audio reproduction device;
aggregating data associated with the first user, the aggregated data including the recognition data; and
providing one or more recommended items to the first user based on the aggregated data.

2. The method of claim 1, further comprising:
receiving a microphone signal from the first audio reproduction device;
determining whether the microphone signal matches a target sound signature; and
responsive to determining that the microphone signal does not match the target sound signature, applying a second digital filter to emulate the target sound signature for the first audio reproduction device.

3. The method of claim 1, further comprising:
receiving a microphone signal from the first audio reproduction device;
determining whether the microphone signal matches a sound signature within a target sound range; and
responsive to determining that the microphone signal does not match the sound signature within the target sound range, applying a third digital filter to emulate the sound signature within the target sound range for the first audio reproduction device.

4. The method of claim 1, further comprising:
measuring a frequency response for the first audio reproduction device;
determining one-third octave band energy levels in two or more frequency bands;
determining average energy levels in the two or more frequency bands;
determining a smoothness parameter for the first audio reproduction device based on the one-third octave band energy levels; and
determining a bass quality parameter for the first audio reproduction device based on the average energy levels.

5. The method of claim 4, wherein the smoothness parameter indicates a smoothness of a sound reproduced by the first audio reproduction device and the bass quality parameter indicates a tonal balance of the first audio reproduction device between a low band and a high band.

6. The method of claim 1, wherein the one or more recommended items include an upgrade of the first audio reproduction device, a second audio reproduction device, a customized feature for the first audio reproduction device and a piece of music.

7. The method of claim 1, wherein the first user is connected to a second user in a social graph and the aggregated data for the first user includes one or more of a first set of music data describing a first piece of music that the first user listens to, interest data describing an interest of the first user, preference data describing one or more user preferences of the first user, profile data describing a user profile of the first user, a first set of social data describing a social activity performed by the first user, a second set of music data describing a second piece of music that the second user listens to and a second set of social data describing a social activity performed by the second user.

8. A non-transitory computer program product comprising a computer usable medium including a computer readable program, wherein the computer readable program when executed on a computer causes the computer to:
capture an image depicting a first audio reproduction device used by a first user;
perform image recognition on the captured image to extract recognition data from the image, the recognition data including data describing the first audio reproduction device and one or more deteriorating factors that deteriorate a sound quality in the first audio reproduction device;

estimate a sound degradation in the first audio reproduction device that is caused by the one or more deteriorating factors;

apply a first digital filter to compensate the sound degradation in the first audio reproduction device;

aggregate data associated with the first user, the aggregated data including the recognition data; and provide one or more recommended items to the first user based on the aggregated data.

9. The non-transitory computer program product of claim 8, wherein the computer readable program when executed on the computer causes the computer to also:

receive a microphone signal from the first audio reproduction device;

determine whether the microphone signal matches a target sound signature; and responsive to determining that the microphone signal does not match the target sound signature, apply a second digital filter to emulate the target sound signature for the first audio reproduction device.

10. The non-transitory computer program product of claim 8, wherein the computer readable program when executed on the computer causes the computer to also:

receive a microphone signal from the first audio reproduction device;

determine whether the microphone signal matches a sound signature within a target sound range; and responsive to determining that the microphone signal does not match the sound signature within the target sound range, apply a third digital filter to emulate the sound signature within the target sound range for the first audio reproduction device.

11. The non-transitory computer program product of claim 8, wherein the computer readable program when executed on the computer causes the computer to also:

measure a frequency response for the first audio reproduction device;

determine one-third octave band energy levels in two or more frequency bands;

determine average energy levels in the two or more frequency bands;

determine a smoothness parameter for the first audio reproduction device based on the one-third octave band energy levels; and determine a bass quality parameter for the first audio reproduction device based on the average energy levels.

12. The non-transitory computer program product of claim 11, wherein the smoothness parameter indicates a smoothness of a sound reproduced by the first audio reproduction device and the bass quality parameter indicates a tonal balance of the first audio reproduction device between a low band and a high band.

13. The non-transitory computer program product of claim 8, wherein the one or more recommended items include an upgrade of the first audio reproduction device, a second audio reproduction device, a customized feature for the first audio reproduction device and a piece of music.

14. The non-transitory computer program product of claim 8, wherein the first user is connected to a second user in a social graph and the aggregated data for the first user includes one or more of a first set of music data describing a first piece of music that the first user listens to, interest data describing an interest of the first user, preference data describing one or more user preferences of the first user, profile data describing a user profile of the first user, a first set of social data describing a social activity performed by the first user, a second set of music data describing a second piece of music that the second user listens to and a second set of social data describing a social activity performed by the second user.

15. A system comprising:

an image capture module capturing an image depicting a first audio reproduction device used by a first user;

an image recognition module communicatively coupled to the image capture module, the image recognition module performing image recognition on the captured image to extract recognition data from the image, the recognition data including data describing the first audio reproduction device and one or more deteriorating factors that deteriorate a sound quality in the first audio reproduction device;

a filter module communicatively coupled to the image recognition module, the filter module estimating a sound degradation in the first audio reproduction device that is caused by the one or more deteriorating factors, the filter module applying a first digital filter to compensate the sound degradation in the first audio reproduction device;

an aggregation module communicatively coupled to the image recognition module and the filter module, the aggregation module aggregating data associated with the first user, the aggregated data including the recognition data; and a recommendation module communicatively coupled to the aggregation module, the recommendation module providing one or more recommended items to the first user based on the aggregated data.

16. The system of claim 15, further comprising:
a microphone signal module receiving a microphone signal from the first audio reproduction device;
a comparison module communicatively coupled to the microphone signal module, the comparison module determining whether the microphone signal matches a target sound signature; and
wherein the filter module is communicatively coupled to the comparison module and the filter module is further configured to apply a second digital filter to emulate the target sound signature for the first audio reproduction device responsive to the determination that the microphone signal does not match the target sound signature.

17. The system of claim 15, further comprising:
a microphone signal module receiving a microphone signal from the first audio reproduction device;
a comparison module communicatively coupled to the microphone signal module, the comparison module determining whether the microphone signal matches a sound signature within a target sound range; and
wherein the filter module is communicatively coupled to the comparison module and the filter module is further configured to apply a third digital filter to emulate the sound signature within the target sound range for the first audio reproduction device responsive to the determination that the microphone signal does not match the sound signature within the target sound range.

18. The system of claim 15, further comprising:
an evaluation module communicatively coupled to the recommendation module, the filter module and the image recognition module, the evaluation module configured to:
measure a frequency response for the first audio reproduction device;
determine one-third octave band energy levels in two or more frequency bands;
determine average energy levels in the two or more frequency bands;

determine a smoothness parameter for the first audio reproduction device based on the one-third octave band energy levels; and determine a bass quality parameter for the first audio reproduction device based on the average energy levels.

19. The system of claim 18, wherein the smoothness parameter indicates a smoothness of a sound reproduced by the first audio reproduction device and the bass quality parameter indicates a tonal balance of the first audio reproduction device between a low band and a high band.

20. The system of claim 15, wherein the one or more recommended items include an upgrade of the first audio reproduction device, a second audio reproduction device, a customized feature for the first audio reproduction device and a piece of music.

* * * * *